US010551869B2

(12) United States Patent
Vrudhula et al.

(10) Patent No.: US 10,551,869 B2
(45) Date of Patent: Feb. 4, 2020

(54) CLOCK SKEWING STRATEGY TO REDUCE DYNAMIC POWER AND ELIMINATE HOLD-TIME VIOLATIONS IN SYNCHRONOUS DIGITAL VLSI DESIGNS

(71) Applicants: Sarma Vrudhula, Chandler, AZ (US); Aykut Dengi, Tempe, AZ (US); Niranjan Kulkarni, Tempe, AZ (US)

(72) Inventors: Sarma Vrudhula, Chandler, AZ (US); Aykut Dengi, Tempe, AZ (US); Niranjan Kulkarni, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 250 days.

(21) Appl. No.: 15/443,444

(22) Filed: Feb. 27, 2017

(65) Prior Publication Data

US 2017/0248989 A1    Aug. 31, 2017

Related U.S. Application Data

(60) Provisional application No. 62/300,413, filed on Feb. 26, 2016.

(51) Int. Cl.
*G06F 1/12* (2006.01)
*G06F 1/10* (2006.01)

(52) U.S. Cl.
CPC . *G06F 1/12* (2013.01); *G06F 1/10* (2013.01)

(58) Field of Classification Search
None
See application file for complete search history.

(56) References Cited

U.S. PATENT DOCUMENTS

| 5,544,203 | A | * | 8/1996 | Casasanta | G06F 1/10 327/149 |
|---|---|---|---|---|---|
| 7,187,742 | B1 | * | 3/2007 | Logue | G06F 1/10 331/16 |
| 2001/0056332 | A1 | * | 12/2001 | Abrosimov | G06F 1/10 702/89 |

OTHER PUBLICATIONS

Deokar, Rahul, et al., "A Graph-theoretic Approach to Clock Skew Optimization," International Symposium on Circuits and Systems, May 1994, IEEE, 4 pages.
Deokar, Rahul, "A Fresh Look at Retiming via Clock Skew Optimization," Design Automation Conference, 1995, ACM, pp. 310-315.

(Continued)

*Primary Examiner* — Fahmida Rahman
(74) *Attorney, Agent, or Firm* — Withrow & Terranova, P.L.L.C.

(57) ABSTRACT

This disclosure relates generally to digital synchronous circuits that introduce clock skew without requiring clock buffers in a clock network. In one embodiment, the digital synchronous circuit includes a first flip flop and a second flip flop. The first flip flop is synchronized to be transparent and to be opaque in accordance with a first clock signal while the second flip flop is configured such that the second flip flop is synchronized to be transparent and to be opaque in accordance with a second clock signal. However, the second flip flop is configured to generate the first clock signal such that the second flip flop provides the first clock signal in a first clock state in response the second flip flop becoming transparent and provides the first clock signal in a second clock state in response the second flip flop becoming opaque thereby providing a clock skew without clock buffers.

17 Claims, 8 Drawing Sheets

(56) References Cited

OTHER PUBLICATIONS

Fishburn, John, "Clock Skew Optimization," IEEE Transactions on Computers, vol. 39, Issue 7, Jul. 1990, IEEE, pp. 945-951.

Kourtev, Ivan, et al., "A Quadratic Programming Approach to Clock Skew Scheduling for Reduced Sensitivity to Process Parameter Variations," ASIC/SOC Conference, Sep. 1999, IEEE, pp. 210-215.

Neves, Jose, "Topological Design of Clock Distribution Networks Based on Non-Zero Clock Skew Specifications," Midwest Symposium on Circuits and Systems, Aug. 1993, IEEE, pp. 468-471.

Kulkarni, Niranjan, "Energy-Efficient Digital Circuit Design using Threshold Logic Gates," Doctoral Dissertation, Arizona State University, Dec. 2015, 196 pages.

Vijayakumar, Arunkumar, et aL, "Glitch Power Reduction via Clock Skew Scheduling," Computer Society Annual Symposium on VLSI, Jul. 2014, IEEE, pp. 504-509.

Weste, N., et al., "CMOS VLSI Design: A Circuit and Systems Perspective," Pearson Education, Inc., 2005.

\* cited by examiner

# CLOCK SKEWING STRATEGY TO REDUCE DYNAMIC POWER AND ELIMINATE HOLD-TIME VIOLATIONS IN SYNCHRONOUS DIGITAL VLSI DESIGNS

RELATED APPLICATIONS

This application claims the benefit of provisional patent application Ser. No. 62/300,413, filed Feb. 26, 2016, the disclosure of which is hereby incorporated herein by reference in its entirety.

GOVERNMENT SUPPORT

This invention was made with government support under 1237856 awarded by the National Science Foundation. The Government has certain rights in the invention.

FIELD OF THE DISCLOSURE

This disclosure relates generally to digital synchronous circuits and methods of designing the same.

BACKGROUND

Synchronous logic has been, and will continue to be for the foreseeable future, the dominant design paradigm of digital systems. In general, a digital synchronous circuit includes a network of combinational clouds interconnected by sequential state elements. Clock skewing is a widely used optimization technique in conventional application-specific integrated circuit (ASIC) designs. Traditionally, clock skewing works by delaying the clock signal using combinational buffers within the clocking network. Conventional design of the clocking networks is based on the assumption that every register receives the clock signal (assuming single phase clocking) at exactly the same time. In practice, guaranteeing simultaneity of clock arrival times is not possible due to gate and interconnect delays. The difference in the clock arrival times at two sequential state elements is referred to as the clock skew between those sequential state elements. There is an extensive body of literature, spanning two decades, on optimizing the design of clock networks aimed at minimizing the skew in order to maximize a clock frequency. Unfortunately, clock buffers consume large amounts of area within an integrated circuit (IC) and also can consume large amounts of power.

Accordingly, techniques and methods are needed to provide clock skew in digital synchronous circuits so that less area and power are consumed within an IC.

SUMMARY

This disclosure relates generally to embodiments of a digital synchronous circuit with sequential state circuit that introduce clock skew. In one embodiment, the digital synchronous circuit includes a first flip flop and a second flip flop. The first flip flop is operable to receive a first clock signal and is configured such that the first flip flop is synchronized to be transparent and to be opaque in accordance with the first clock signal. The second flip flop is operable to receive a second clock signal and is configured such that the second flip flop is synchronized to be transparent and to be opaque in accordance with the second clock signal. However, the second flip flop is configured to generate the first clock signal such that the second flip flop provides the first clock signal in a first clock state in response to the second flip flop becoming transparent and provide the first clock signal in a second clock state in response to the second flip flop becoming opaque. Accordingly, a characteristic propagation delay of the second flip flop can provide a clock skew between the first clock signal and the second clock signal. Thus, the digital synchronous circuits described herein have been shown to consume less power and area since the clock skew can be introduced without requiring clock buffers in a clock network.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
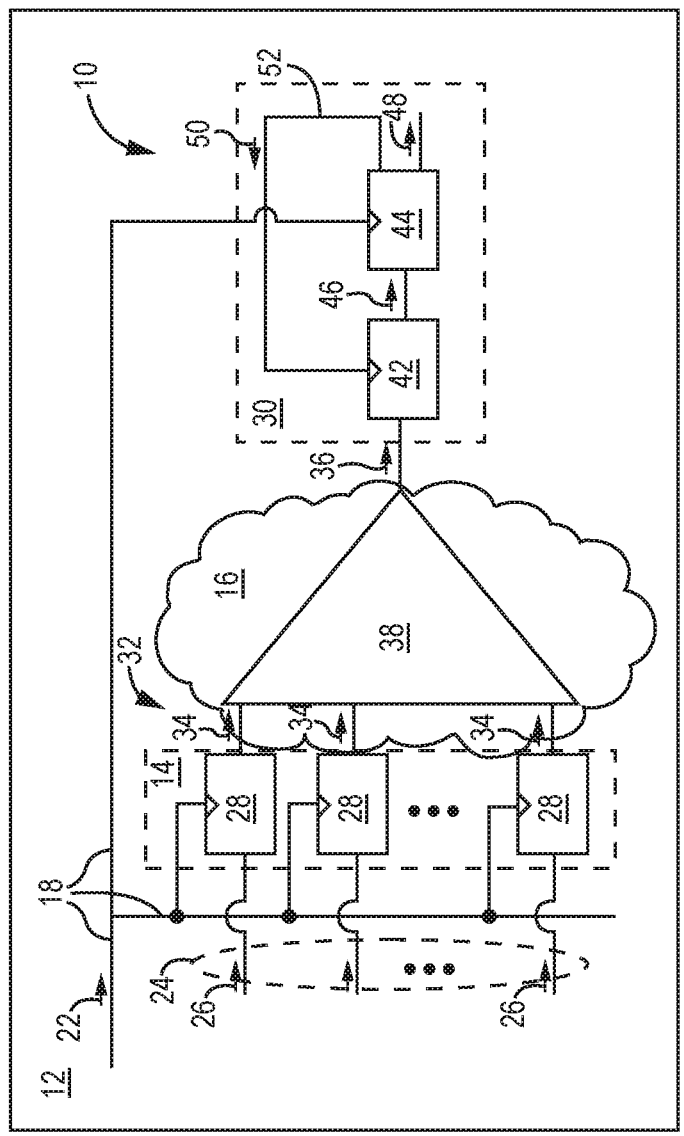
FIG. 1 illustrates an embodiment of a digital synchronous circuit having a sequential state circuit having a first flip flop and a second flip flop arranged to provide clock skew without clock buffers.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Also, throughout this disclosure, relative terminology, such as "approximately," "substantially," and the like, may be used to modify a predicate where the predicate describes features and relationships of an apparatus or procedure. The relative terminology that modifies the predicate should be interpreted sensu lato. However, whether the predicate modified by the relative terminology is satisfied is determined in accordance with error ranges and/or variation tolerances for the apparatus or procedure and prescribed by technical standard(s) and/or technical specification(s) relevant to the features and relationships of the apparatus or procedure that are described by the predicate. For example, a particular application employing the apparatus or procedure may be designed to operate in accordance with certain technical standards, specifications, or the like. These technical standards and specifications may explicitly prescribe the error ranges and/or variation tolerances relevant to the features and relationships of the apparatus or procedure described by the predicate. Additionally or alternatively, these technical standards and specifications may describe performance parameters related to the apparatus or procedure from which the error ranges and/or variation tolerances relevant to the features and relationships of the apparatus or procedure described by the predicate can be deduced or inferred.

When the term "in silico" is used as a qualifier throughout this disclosure, the term "in silico" is indicating that the referent qualified by "in silico" is a computer model of a physical object described by the referent. For example, an in silico integrated circuit (IC) is a computer model of an IC. The computer model can include one or more digital representations of the physical object described by the referent, including behavioral, functional, and/or physical representations. Thus, for instance, the in silico IC may include a behavioral representation (e.g., register transfer level (RTL) description), a functional representation (e.g., gate level netlist), and/or a physical representation (e.g., a physical circuit layout).

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

This disclosure relates to generally to digital synchronous circuits and methods of operating and designing the same. More specifically, different arrangements of flip flops and sequential state circuits are described herein that provide clock skew without requiring clock buffers. Thus, the digital synchronous circuits include sequential state circuits that are provided in accordance with these arrangements. These sequential state circuits thus provide clock skew in the digital synchronous circuit so that this clock skew does not need to be provided by clock buffers within a clock network. Accordingly, the digital synchronous circuits are thus smaller in size. Furthermore, the arrangements of the flip flops described herein also have been shown to reduce power consumption without sacrificing performance.

FIG. 1 illustrates an embodiment of a digital synchronous circuit 10 in accordance with this disclosure. The digital synchronous circuit 10 is formed as part of an integrated circuit (IC) and thus is formed on a semiconductor die 12. The semiconductor die 12 may be formed in accordance to any semiconductor technology utilized to form digital synchronous circuitry. In this embodiment, the semiconductor die 12 is formed in accordance with a 65 nanometer Complementary Metal Oxide Semiconductor (CMOS) technology. The digital synchronous circuit 10 may be a subcircuit in a larger digital synchronous circuit 10 as explained in further detail below.

As shown in FIG. 1, the digital synchronous circuit 10 includes a sequential state circuit 14, a combinational logic circuit (CLC) 16, a global clock tree 18, and a sequential state circuit 20. As mentioned above, the digital synchronous circuit 10 may be provided as part of a larger digital synchronous circuit in order to handle perform a digital operation of a finite state machine. For example, the digital synchronous circuit 10 may be provided in order to provide fetch operations, instruction decode operations, multiplier, adder, encode operations, register file operations, instruction execution operations, logical memory access operations, register file write back operations, and/or any other digital operation. As shown in FIG. 1, the digital synchronous circuit 10, the CLC 16 is an acyclic network that is configured to handle the particular operation of each of the digital synchronous circuit 10. Accordingly, the CLC 16 may include an arrangement of combinational logic elements (e.g., acyclic logic gates) configured to provide logic that implements the operation of the digital synchronous circuit 10. For example, static combinational elements and/or dynamic combinational elements may be utilized.

To synchronize the digital synchronous circuit 10, the digital synchronous circuit 10, the sequential state circuit 14 and the sequential state circuit 20 coordinate transfer of valid bit states so that these bit states can be received and transferred appropriately to and from other circuitry (not specifically shown), such as other digital synchronous circuits that perform other operations in a larger digital synchronous circuit that includes the digital synchronous circuit 10. In this embodiment, the global clock tree 18 is configured to provide a global clock signal 22 to the sequential state circuits 14, 20 in order to synchronize the transfer of bit states into and out of the digital synchronous circuit 10.

In this embodiment, the sequential state circuit 14 is configured to receive a digital input 24. The digital input 24 includes a set of data inputs 26. Each of the data inputs 26 has a variable bit state that varies between a bit state of logic "1" and a bit state of logic "0" as a function of time. Thus, as the logical bit represented by each of the data inputs 26 changes through time, the variable bit state of each particular data input 26 changes to represent that particular logical bit. By synchronizing the sequential state circuit 14 with the global clock signal 22, each of the data inputs 26 represents a different logical bit during each clock cycle of the global clock signal 22.

More specifically, the sequential state circuit 14 includes a plurality of flip flops 28 where each of the flip flops 28 is configured to receive a different corresponding one of the data inputs 26. As such, the plurality of flip flops 28 of the sequential state circuit 14 correspond bijectively to the set of data inputs 26 of the digital input 24. Each of the flip flops 28 is also configured to receive the global clock signal 22 from the global clock tree 18. The global clock signal 22 oscillates between a set of clock states. Generally, the set of clock states includes a first clock state and a second clock state. Throughout the description of the specific embodiments in this disclosure, the first clock state is presumed to be a high clock state while the second clock state is presumed to be a low clock state. However, in alternative embodiments, the first clock state may be the low clock state and the second clock state may be a high clock state as would be apparent to one of ordinary skill in the art in light of this disclosure.

The global clock signal 22 may thus be provided as a temporal series of clock pulses. The global clock signal 22 provides the temporal series of clock pulses in a standard temporal clock format. Thus, the global clock signal 22 in this embodiment is approximately isochronous and has approximately a 50% duty cycle. Accordingly, the global clock signal 22 has a time period of oscillation, which equals approximately a temporal duration of each clock cycle. Furthermore, during each clock cycle, the global clock signal 22 provides a clock pulse for approximately 50% of the temporal duration of each clock cycle, and thus the global clock signal 22 is in the first clock state for approximately 50% of the temporal duration of each clock cycle and in the second clock state for approximately 50% of the temporal duration of each clock cycle.

As shown in FIG. 1, the sequential state circuit 14 is further configured to generate digital output 32, which include a set of logical outputs 34. As shown in FIG. 1, each of the flip flops 28 is configured to generate a different corresponding one of the logical outputs 34. Each of the logical outputs 34 also has a variable bit state that is set based on the variable bit state of the corresponding one of the data inputs 26 received by the corresponding flip flop 28. Thus, the plurality of flip flops 28 correspond bijectively with the set of digital outputs 32. In this embodiment, each flip flop 28 is configured to generate the corresponding logical output 34 so that the variable bit state of the combinational logic cone 38 is set to be the same as the variable bit state of the corresponding data input 26. Additionally, the global clock signal 22 determines when the variable bit state of the corresponding digital output 32 is updated to the variable bit state of the corresponding data input 26.

As shown in FIG. 1, each of the flip flops 28 is transparent while the global clock signal 22 is in the first clock state. Thus, each of the flip flops 28 is configured to set up the corresponding logical output 34 so that the variable bit state of the corresponding logical output 34 is provided in accordance with the variable bit state of the corresponding data input 26 while the global clock signal 22 is in the first clock state. However, each of the flip flops 28 is opaque while the global clock signal 22 is in the second clock state. Thus, each of the flip flops 28 is configured to hold the corresponding logical output 34 so that the variable bit state of the corresponding logical output 34 is maintained and cannot be changed by the variable bit state of the corresponding data input 26 while the global clock signal 22 is in the second clock state. The digital output 32 is then provided to the CLC 16 as a digital input to the CLC 16. The CLC 16 then performs the digital operation to generate a digital output (not expressly shown in FIG. 1). As shown in FIG. 1, the digital output includes a logical output which is received as a data input 36 by the sequential state circuit 30.

In this embodiment, the CLC 16 includes a combinational logic cone 38 is defined with the CLC 16 wherein the combinational logic cone 38 is configured to generate the data input 36 based on the set of logical outputs 34 from the flip flops 28. In this manner, the combinational logic cone 38 is configured to perform a digital operation, which is a sub operation of the digital operation provided by the CLC 16. As shown in FIG. 1, the sequential state circuit 30 includes a flip flop 42 and a flip flop 44. As discussed below, the arrangement of the flip flop 42 and the flip flop 44 implement a clock skewing technique that allows the digital synchronous circuit 10 to consume less area and less power than more traditional clock skewing techniques.

As shown in FIG. 1, the flip flop 42 is configured to receive the data input 36 and is configured to generate a logical output 46. To provide synchronization, the flip flop 42 is configured to receive a clock signal 50 from the flip flop 44, as explained in further detail below. As described below, the flip flop 44 is configured such that the flip flop 42 is synchronized to be transparent and to be opaque in accordance with the clock signal 50. The flip flop 44 is configured to generate the clock signal 50, as explained in further detail below, so that the clock signal 50 is skewed with respect to the clock signal 22. Thus, the clock signal 50 oscillates between the first clock state and the second clock state, just like the clock signal 22. However, the clock signal 50 is delayed with respect to the clock signal 22 and thus the clock signal 50 may thus be provided as a temporal series of clock pulses that are delayed with respect to the temporal series of clock pulses of the clock signal 22.

Accordingly, in this embodiment, the clock signal 50 is approximately isochronous and has approximately a 50% duty cycle. Accordingly, the clock signal 50 has a time period of oscillation that is approximately equal to the period of oscillation of the clock signal 22. Thus, during each clock cycle, the clock signal 50 provides a clock pulse for approximately 50% of the temporal duration of each clock cycle, and thus the clock signal 50 is in the first clock state for approximately 50% of the temporal duration of each clock cycle and in the second clock state for approximately 50% of the temporal duration of each clock cycle.

The data input 36 has a variable bit state that varies between a bit state of logic "1" and a bit state of logic "0" as a function of time. Thus, as the logical bit represented by each of the data inputs 26 changes through time, the variable bit state of each particular data input 26 changes to represent that particular logical bit. By synchronizing the sequential state circuit 14 with the clock signal 50, each of the data inputs 26 represents a different logical bit during each clock cycle of the clock signal 50.

The flip flop 42 is configured to generate the logical output 46. Thus, the logical output 46 has a variable bit state that is set based on the variable bit state the data input 36 received by the flip flop 42 from the combinational logic cone 38. In this embodiment, the flip flop 42 is configured to generate the logical output 46 so that the variable bit state of the logical output 46 is set to be the same as the variable bit state of the data input 36. However, the clock signal 50 synchronizes the flip flop 42 so as to determine when the variable bit state of the logical output 46 is updated to the variable bit state of the data input 36.

Thus, the flip flop 42 shown in FIG. 1 is configured such that the flip flop 42 is synchronized to be transparent and to be opaque in accordance with the clock signal 50. Thus, the flip flop 42 is transparent while the clock signal 50 is in the first clock state. As such, the flip flop 42 is configured to set up the logical output 46 while the clock signal 50 is in the first clock state. Therefore, the flip flop 42 is configured to provide the variable bit state of the logical output 46 in accordance with the variable bit state of the data input 36 while the clock signal 50 is in the first clock state. Accordingly, the flip flop 42 updates the variable bit state of the logical output 46 in response to the clock signal 50 being provided in the first clock state. On the other hand, the flip flop 42 is opaque while the clock signal 50 is in the second clock state. Thus, the flip flop 42 is configured to hold the logical output 46 while the clock signal 50 is provided in the second clock state. Therefore, the flip flop 42 is configured to maintain the variable bit state of the logical output 46 so that the variable bit state of the logical output 46 cannot be changed by the variable bit state of the data input 36.

Since the flip flop 44 generates the clock signal 50 that synchronizes the flip flop 42, the flip flop 44 is referred to as a source flip flop (also referred to generically is some embodiments as flip flop X) and the flip flop 42 is referred to as a target flip flop (also referred to generically is some embodiments as flip flop Y). In this example, the clock signal 22 is a global clock signal and thus the flip flop 44 shown in FIG. 1 is only a source flip flop and is not a target flip flop. Furthermore, since the flip flop 42 does not generate a clock signal, the flip flop 42 is only a target flip flop. However, in alternative embodiments, the flip flop 44 may receive a clock signal (not shown in FIG. 1) from another flip flop (which is not explicitly shown in FIG. 1) that is structurally and electronically identical to flip flop 44) and thus generated a clock signal, like the clock signal 50 shown in FIG. 1. Thus, in these alternative embodiments, the flip flop 44 may be a source flip flop X with respect to the clock signal 50 but a target flip flop Y with respect to the clock signal generated by the other flip flop. Thus, in other embodiments, there may be any number of clock layers target flip flops Y and source flip flops X.

The arrangement of the flip flop 42 and the flip flop 44 provides clock skewing without requiring buffers in the global clock tree 18 and with increased power efficiency. Instead, the flip flop 44 is configured to provide a characteristic propagation delay of the flip flop 44 so that the flip flop 44 is configured generate the clock signal 50 such that the clock skew between the clock signal 50 and the clock signal 22 is on average approximately equal to the characteristic propagation delay of the flip flop 44. Thus, the clock skew is provided by a propagation delay (which is approximately equal to the characteristic propagation delay of the flip flop 44) in responding to a clock edge in the clock signal 22 and to generating a corresponding clock edge in the clock signal 50. Since buffers are not required to provide the clock skew, the amount of area consumed by the digital synchronous circuit 10 is reduced.

The flip flop 44 shown in FIG. 1 is configured to receive the clock signal 22 and thus is synchronized by the clock signal 22. Again, in this example, the clock signal 22 is a global clock signal. Thus, the global clock tree 18 is connected to the flip flop 44 so that the flip flop 44 is configured to receive the clock signal 22 from the global clock tree 18. Furthermore, in this embodiment, the flip flop 44, the flip flop 44 is configured to receive the logical output 46 from the flip flop 42 as a data input and thus is sometimes referred to as data input 46. In alternative embodiments, this may or may not be the case wherein the flip flop 44 and the flip flop 42 each receive independent data inputs from different CLCs.

Referring again to FIG. 1, the flip flop 44 is configured such that the flip flop 44 is synchronized to be transparent and opaque in accordance with the global clock signal 22 from the clock tree 18. The flip flop 44 is configured to generate the logical output 48 so that a variable bit state of the logical output 48 is provided in accordance with the logical output 46 while the clock signal 22 is in the first clock state. Thus, the flip flop 44 is transparent so long as the clock signal 22 is in the first clock state. Accordingly, the flip flop 44 is configured to set up the logical output 48 in accordance with the logical output 46 while the clock signal 22 is in the first clock state. In this embodiment, the flip flop 44 is configured to generate the logical output 48 so that the variable bit state of the logical output 48 is set to be the same as the variable bit state of the logical output 46. The clock signal 22 thus synchronized the flip flop 44 to determine when the variable bit state of the logical output 48 is updated to the variable bit state of the logical output 46.

Accordingly, the flip flop 44 updates the variable bit state of the logical output 48 in response to the clock signal 22 being provided in the first clock state. On the other hand, the flip flop 44 is opaque so long as the clock signal 22 is in the second clock state. Thus, the flip flop 44 is configured to hold the logical output 48 while the clock signal 22 is provided in the second clock state. While opaque, the flip flop 44 is configured to maintain the variable bit state of the logical output 48 and so that the variable bit state of the logical output 48 is unresponsive to the variable bit state of the logical output 46. As mentioned above, the flip flop 44 shown in FIG. 1 is configured to receive the clock signal 22 from the global clock tree 18 and thus in this embodiment the clock signal 22 is the global clock signal.

The flip flop 44 is configured to generate the clock signal 50 wherein, as discussed above, the flip flop 42 synchronizes the updating of the variable bit state of the logical output 46 in accordance with the clock signal 50. In this embodiment, the flip flop 44 is configured to generate the clock signal 50, which synchronizes the flip flop 42 as discussed above. The flip flop 44 is structurally arranged so that the flip flop 44 has a characteristic propagation delay, which approximates the average time delay between the flip flop 44 receiving a clock edge of the clock signal 22 and the flip flop 44 providing a corresponding clock edge in the clock signal 50 in response to the clock edge of the clock signal 22.

As shown in FIG. 1, the sequential state circuit 30 includes a local clock path 52. The local clock path 52 is connected between the flip flop 42 and the flip flop 44 so that the clock signal 50 is transmitted from the flip flop 44 to the flip flop 42 along the local clock path 52. The local clock path 52 reduces power consumption because the local clock path 52 introduces timing slack violating timing constraints. Accordingly, positive clock slack can be introduced into the design of the local clock path 52 using technology mapping and layout tools that reduce size and power of the digital synchronous circuit 10.

Not requiring buffers to skew the clock has some obvious advantages. It can reduce the area consumption and be dynamic enough to reduce power leakage. Since buffer delays are not needed, clock skew precision can be provided with fewer constraints on the design. Thus, the flip flop 44 is configured to generate the clock signal 50 so that on average the clock skew between the clock signal 50 and the clock signal 22 is approximately equal to the characteristic propagation delay of the flip flop 44 at an input end of a local clock path 52.

An output end of the local clock path 52 is connected to provide the clock signal 50 to the flip flop 42. The local clock path 52 defines a characteristic path delay so that on average a clock skew of the clock signal 50 from the input end of the local clock path 52 and the output end of the local clock path 52 is approximately equal to the characteristic path delay. Thus, the clock skew between the clock signal 50 at the output end of the local clock path 52 and the clock signal 22 as received by the flip flop 42 is on average approximately equal to the characteristic path delay of the local clock path 52 and the characteristic propagation delay of the flip flop 44.

The flip flop 44 is configured such that the flip flop 44 is synchronized to be transparent and to be opaque in accordance with the global clock signal 22 More specifically, the flip flop 44 is configured to generate the clock signal 50 in the first clock state in response to the flip flop 44 becoming transparent. Again, the clock skew between the clock signal 50 and the clock signal 22 at the input end of the local clock path 52 is on average approximately equal to the characteristic propagation delay of the flip flop 44. Thus, a temporal distance between a positive clock edge in the clock signal 22 and a positive clock edge of the clock signal 50 is on average approximately equal to the characteristic propagation delay.

On the other hand, the flip flop 44 is configured to generate the clock signal 50 in the second clock state in response to the flip flop 44 becoming opaque. Again, in this embodiment, the clock skew between the clock signal 50 and the clock signal 22 at the input end of the local clock path 52 is on average approximately equal to the characteristic propagation delay of the flip flop 44. Thus, a temporal distance between a negative clock edge in the clock signal 22 and a negative clock edge of the clock signal 50 is also on average approximately equal to the characteristic propagation delay.

Figure 2:
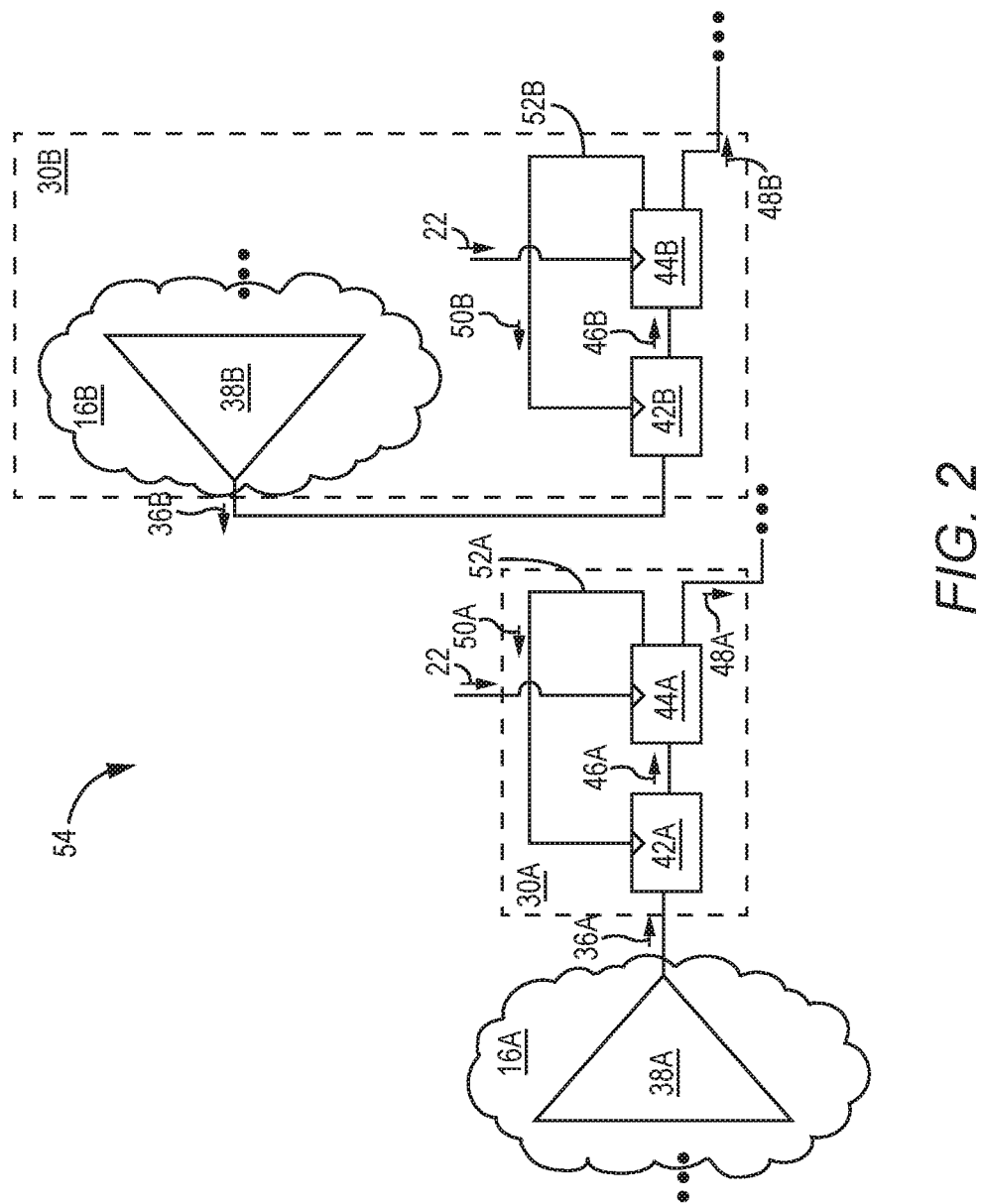
FIG. 2 illustrates an embodiment of a digital synchronous circuit having sequential state circuits like the sequential state circuit shown in FIG. 1 while the digital synchronous circuit operates in the normal mode.

FIG. 2 illustrates another embodiment of a digital synchronous circuit 54 that includes sequential state circuits 30A, 30B that are both identical to the sequential state circuit 30 shown in FIG. 2. The sequential state circuits 30A, 30B shown in FIG. 2 as physically arranged within the digital synchronous circuit 54. Furthermore, signal propagation is shown in FIG. 2 as provided while the digital synchronous circuit 54 is operating in a normal operation mode.

The sequential state circuits 30A, 30B shown in FIG. 2 are independent of and are each provided in different parts of the digital synchronous circuit 54. More specifically, the digital synchronous circuit 54 shown in FIG. 2 includes a CLC 16A that includes a combinational logic cone 38A. The combination logic cone 38A is configured to generate a data input 36A. The sequential state circuit 30A thus includes a flip flop 42A and a flip flop 44A that are identical to the flip flop 42 and the flip flop 44 shown in FIG. 1. Thus, the flip flop 42A and the flip flop 44A are arranged and operate with respect to the data input 36A, a logical output 46A, a logical output 48A, the clock signal 22, a clock signal 50B and a local clock path 52A in the same manner as the sequential state circuit 30 described above in FIG. 1 with respect to the data input 36, the logical output 46, the logical output 48, the clock signal 22, the clock signal 50, and the local clock path 52.

Additionally, the digital synchronous circuit 54 shown in FIG. 2 includes a CLC 16B that includes a combinational logic cone 38B. The combination logic cone 38B is configured to generate a data input 36B. The sequential state circuit 30B thus includes a flip flop 42B and a flip flop 44B that are identical to the flip flop 42 and the flip flop 44 shown in FIG. 1. Thus, the flip flop 42B and the flip flop 44B are arranged and operate with respect to the data input 36B, a logical output 46B, a logical output 48B, the clock signal 22, a clock signal 50B and a local clock path 52B in the same manner as the sequential state circuit 30 described above in FIG. 1 with respect to the data input 36, the logical output 46, the logical output 48, the clock signal 22, the clock signal 50, and the local clock path 52.

Figure 3:
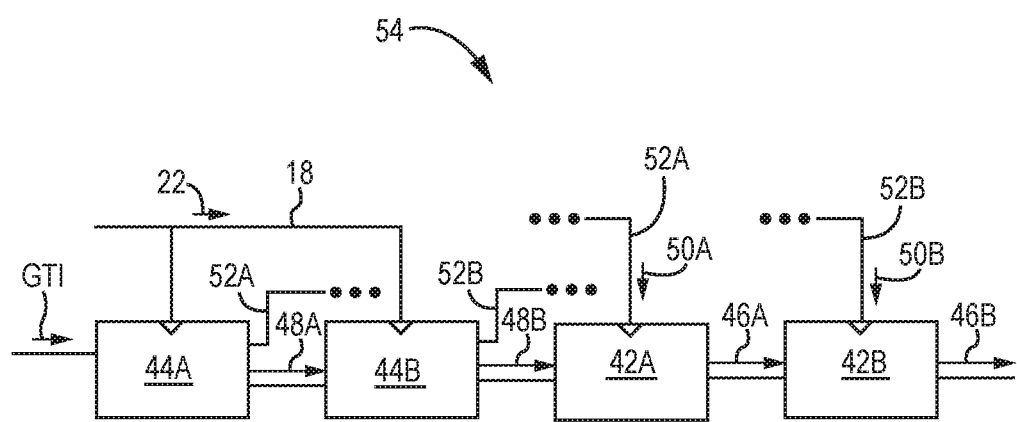
FIG. 3 illustrates the embodiment of the digital synchronous circuit while the digital synchronous circuit operates in the scan mode.

FIG. 3 illustrates the digital synchronous circuit 54 as connected while the digital synchronous circuit 54 is operating in a scan mode. Thus, the flip flops 42A, 44A, 42B, 44B are the same as those seen in FIG. 2. However, the flip flops 42A, 44A, 42B, 44B shown in FIG. 4 describes an order of propagation within the digital synchronous circuit 54 while the digital synchronous circuit 54 is operating in the scan mode. Furthermore, the operation of the flip flops 42A, 44A, 42B, 44B in FIG. 3 describes the arrangement of the flip flops 42A, 44A, 42B, 44B while operating in the scan mode. Thus, the digital synchronous circuit 54 is configured to connect the flip flops 42A, 44A, 42B, 44B so that the flip flops 42A, 44A, 42B, 44B form a scan chain as shown in FIG. 3.

More specifically, while the digital synchronous circuit 54 is operating in the scan mode, the digital synchronous circuit 54 is configured to connect the flip flops 44A and the flip flop 44B so that the flip flops 44A and 44B are at the beginning on the scan chain. As shown in FIG. 3, the flip flop 44A is configured to receive a global test input GTI so that in the scan mode the flip flop 44A generates the logical output 48A in accordance with the global test input GTI. Additionally, instead of receiving the logical output 46A from the flip flop 42A, the flip flop 44B is configured to receive the logical output 48A from the flip flop 44A while the digital synchronous circuit 54 is operating in the scan mode. Furthermore, instead of receiving the logical output 46B from the flip flop 42B, the flip flop 44B is configured to receive the logical output 48A from the flip flop 44A. Additionally, instead of receiving the data input 36A from the combinational logic cone 38A (shown in FIG. 2), the flip flop 42A is configured to receive the logical output 48B from the flip flop 44B. Finally, the instead of receiving the data input 36B from the combinational logic cone 38B (shown in FIG. 2), the flip flop 42B is configured to receive the logical output 46A from the flip flop 42A. Furthermore, during the scan mode, the logical output 46B is provided as a global test output.

The arrangement of the digital synchronous circuit 54 can be used to prevent initialization problems that may occur if initialization occurs during the normal operational mode. In the normal operational mode, the flip flops 44A, 44B are ahead in the clock chain but behind the flip flop 42A and the flip flop 42B respectively in the data chain. Thus, a dead loop condition may occur that may prevent the sequential state circuits 30A, 30B from initializing correctly in the normal operational mode. Instead, the sequential state circuits 30A, 30B are initialized in the scan mode so that the flip flops 44A, 44B are ahead in the clock chain and in the data chain during the scan mode. This ensures that the flip flops 44A, 44B receive a proper test-input in each cycle of the clock signal 22 during intialization. The digital synchronous circuit 54 may operate in the scan mode for as many cycles as there are source flip flops (i.e. two cycles since there are two source flip flops 44A, 44B in the digital synchronous circuit 54 shown in FIG. 3.

Figure 4:
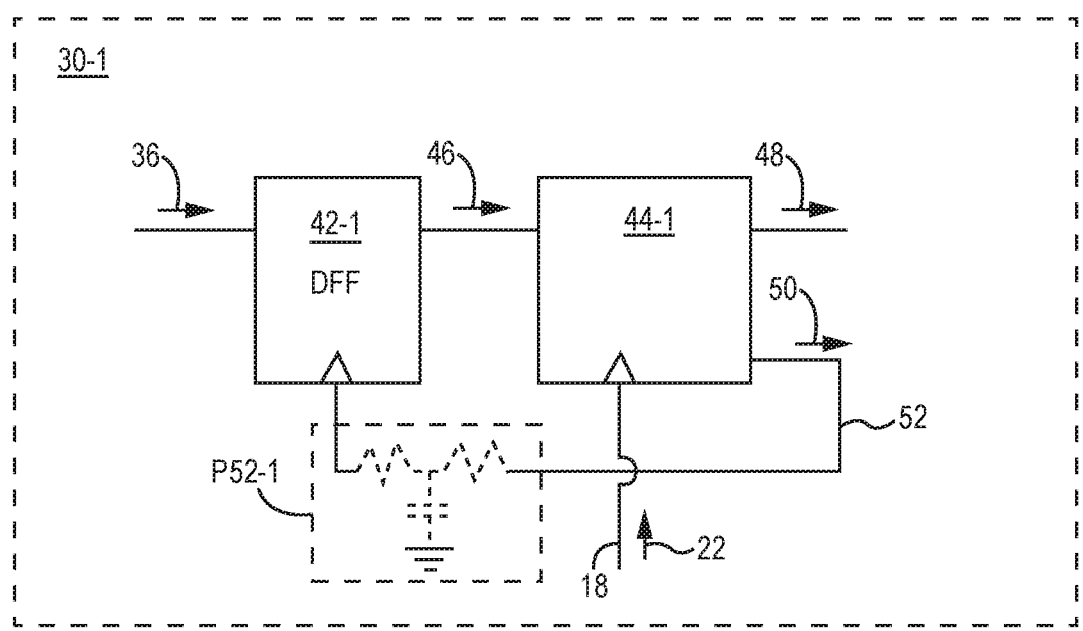
FIG. 4 illustrates one type of sequential state circuit that may be provided as the sequential state circuit shown in FIG. 1, wherein the first flip flop is a D flip flop and the second flip flop is a KVFF.

FIG. 4 illustrates a sequential state circuit 30-1, which is one type of sequential state circuit which may be provided as the sequential state circuit 30 in FIG. 1. The sequential state circuit 30-1 shown in FIG. 4 includes a flip flop 42-1 and a flip flop 44-1. The flip flop 42-1 is one type of flip flop that may be provided as the flip flop 42 shown in FIG. 1. More specifically, the flip flop 42-1 is a D flip flop (DFF) which is a master slave edge trigger flip flop. The flip flop 44-1 is a particular is type of flip flop that may be provided as the flip flop 44 shown in FIG. 1. An exemplary circuit diagram of the flip flop 44-1 is shown in FIG. 5 and described below.

Figure 5:
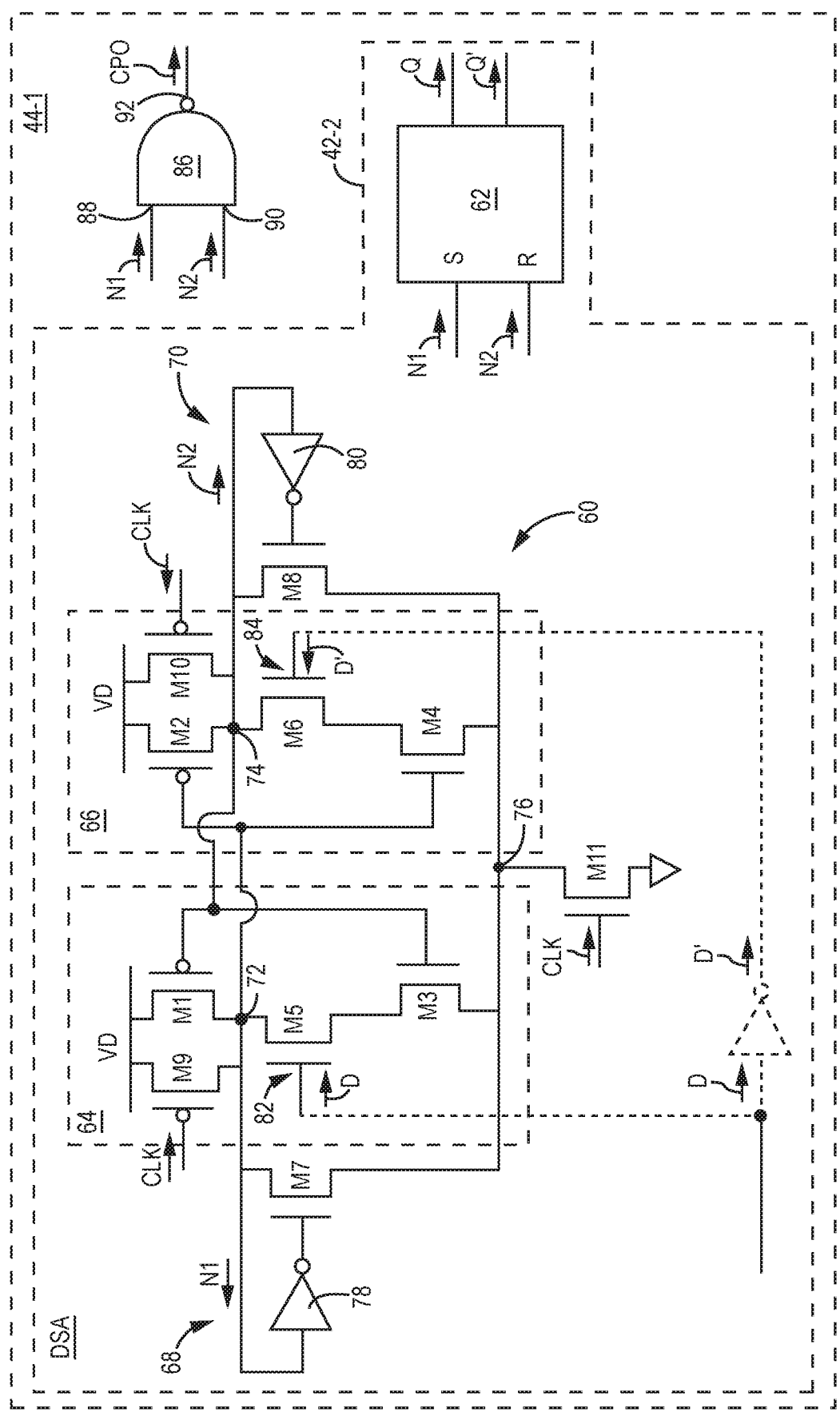
FIG. 5 illustrates a circuit diagram of the second flip flop shown in FIG. 4.

FIG. 5 is a circuit diagram of the flip flop 44-1 shown in FIG. 4. FIG. 5 illustrates an exemplary circuit diagram of a differential sense flip flop (DSFF) 60. The particular arrangement shown in FIG. 5 is one type of flip flop that has been named the Kulkarni Vrudhula flip flop (KVFF). In general, the DSFF 60 includes a differential sense amplifier DSA formed by a first amplifier branch 64, a second amplifier branch 66, a first switchable discharge path 68, and a second switchable discharge path 70. In this embodiment, the DSFF 60 includes a SR latch 62 configured to generate a data output Q and an inverted data output Q' in accordance with the first logical output N1 and the second logical output N2 from the DSFF 60. The inverted data output Q' is an inversion of the data output Q. The first amplifier branch 64 has an output node 72 and the second amplifier branch 66 has an output node 74.

The differential sense amplifier DSA is configured to generate a differential logical output (DLO) from the output node 72 and the output node 74. More specifically, the first amplifier branch 64 and the second amplifier branch 66 are cross coupled such that the first amplifier branch 64 is configured to generate a first logical output N1 of the differential logical output DLO at the output node 72 and such that the second amplifier branch 66 is configured to generate a second logical output N2 of the differential logical output DLO at the output node 74, as explained in further detail below. The first switchable discharge path 68 is operable to receive the first logical output N1 as feedback from the first amplifier branch 64 and is configured to be opened and closed in accordance with the first logical output N1. The first switchable discharge path 68 is connected to the first amplifier branch 64 such that the output node 72 is discharged when the first switchable discharge path 68 is closed. The second switchable discharge path 70 is operable to receive the second logical output N2 as feedback from the second amplifier branch 66 and is configured to be opened and closed in accordance with the second logical output N2. The second switchable discharge path 70 is connected to the second amplifier branch 66 such that the output node 74 is discharged when the second switchable discharge path 70 is closed.

As explained below, the DSFF 60 is operable in an evaluation state and in a reset state. More specifically, the DSFF 60 is synchronized to cycle between the evaluation state and the reset state in accordance with a clock signal CLK. In this embodiment, the differential sense amplifier is operable to receive the clock signal CLK. The differential sense amplifier is configured to operate in the reset state in response to the clock signal CLK being in the second clock state. This embodiment of the DSFF is triggered to operate in the reset state while the clock state is in a low voltage state (which corresponds to the second clock state of logical "0"). However, alternate oppositely triggered embodiments of the DSFF 60 may operate in the reset state with the second clock state being a logical "1" instead.

While the clock signal is in the second clock state (i.e., the low voltage state of logical "0" in this embodiment), the differential sense amplifier is configured to generate the DLO in a precharge state. More specifically, the first amplifier branch 64 is configured to pull up the output node 72 to a high voltage state (which is a logical "1"). Furthermore, the second amplifier branch 66 is configured to pull up the output node 74 to the high voltage state, which is the logical state of "1." In this case, the first logical output N1 and the second logical output N2 are in the same logical state. Accordingly, the SR latch 62 is configured to hold the data output Q and the inverted data output Q' in response to the first logical output N1 and the second logical output N2 both having the same logical state.

The differential sense amplifier is configured to operate in the evaluation state in response to the clock signal CLK being in the first clock state. Again in this embodiment, the differential sense amplifier is configured to operate in the evaluation state with the clock signal CLK being in a high voltage state (which in this embodiment corresponds to the first clock state and logical "1.") Other alternate oppositely triggered embodiments of the DSFF 60 may operate in the reset state with the first clock state being a logical "0" instead.

The differential sense amplifier is configured to generate the DLO in any one of a set of differential output states during the evaluation state. More specifically, the first amplifier branch 64 of the differential sense amplifier is configured to receive a data input D and the second amplifier branch 66 is configured to receive an inverted data input D'. The data input D and the inverted data input D' are inverted with respect to one another. Thus, the data input D and the inverted data input D' are a differential data input. During the reset state, the DSFF 60 is opaque and the data input D and the inverted data input D' don't affect the data output Q and the inverted data output Q'. However, in response to the clock signal CLK being in the second clock state, the DSFF 60 is transparent and operates in the evaluation state. Thus, while the clock signal CLK is in the second clock state, the DSFF 60 is configured to set the data output Q and the inverted data output Q' in accordance with the data input D and the inverted data input D'.

More specifically, the first amplifier branch 64 and the second amplifier branch 66 will be in a current race. The differential input is configured to be provided in any one of a set of differential input states. More specifically, the differential input is in a first differential input state of "1/0" when the data input D has a logical state of "1" and the inverted data input D' has a logical state 0." The differential input is in a second differential input state of "0/1" when the data input D has a logical state of "0" and the inverted data input D' has a logical state 1." The differential sense amplifier DSA is configured so that whichever one of the first amplifier branch 64 and the second amplifier branch 66 receives the logical state "1" should win the current race, as explained in further detail below. More specifically, the first amplifier branch 64 is configured to discharge the output node 72 in response to the data input D being a logical "1" while the clock signal is in the first clock state. On the other hand, the second amplifier branch 66 is configured to discharge the output node 74 in response to the inverted data input D' being a logical "1" while the clock signal is in the first clock state.

The first amplifier branch 64 is cross coupled to the output node 74 of the second amplifier branch 66 and the second amplifier branch 66 is cross coupled to the output node 72 of the first amplifier branch 64. As such, the second amplifier branch 66 is configured to receive the first logical output N1 from the output node 72 as feedback. Therefore, if the differential input was in the first differential input state "0/1", the first amplifier branch 64 is configured to discharge the output node 72 and the first logical output N1 will be a logical "0" once the output node 72 discharges. In response to the first logical output N1 having the logical state "0", the second amplifier branch 66 is configured to pull up the output node 74 and maintain the second logical output N2 at the logical state of "1." In this case, therefore, the differential sense amplifier is configured to generate the DLO in a first differential output state of "0/1."

Note however, that this operation is dependent on the output node 72 discharging fast enough so that the second amplifier branch 66 is forced by the first logical output N1 to pull up the output node 74 before it discharges sufficiently due to leakage currents. Until this happens, the output node 74 is simply holding charge and is left floating. The output node 74 would thus be vulnerable to noise on the data input D and the inverted data input D' as well as the effects of device variations. To prevent the output node 74 and other nodes in the second amplifier branch from floating, the first amplifier branch 64 is configured to closed in response to the first logical output N1 having the logical state "0." As such, the first switchable discharge path 68 provides the output node 72 with a closed path to ground and therefore prevents nodes in the second amplifier branch 66 from floating. The SR latch 62 in this embodiment is a NAND SR latch. Therefore in response to the DLO being in the first differential output state of "0/1," the SR latch 62 is configured to generate the data output Q having a logical state of "1" and the inverted data output Q' having a logical state "0." Note therefore that during the evaluation state, the logical state of data output Q is the same as the logical state of the data input D and the logical state of inverted data output Q' is the same as the logical state of the inverted data input D'.

The first amplifier branch 64 is configured to receive the second logical output N2 from the output node 74 as feedback. Therefore, if the differential input was in the second differential input state "0/1", the second amplifier branch 66 is configured to discharge the output node 74 and the second logical output N2 will be a logical "0" once the output node 74 discharges. In response to the second logical output N2 having the logical state "0", the first amplifier branch 64 is configured to pull up the output node 72 and maintain the first logical output N1 at the logical state of "1." In this case, therefore, the differential sense amplifier is configured to generate the DLO in a second differential output state of "1/0."

Note however, that this operation is dependent on the output node 74 discharging fast enough so that the first amplifier branch 64 is forced by the second logical output N2 to pull up the output node 72 before it discharges sufficiently due to leakage currents. Until this happens, the output node 72 is simply holding charge and is left floating. The output node 72 would thus be vulnerable to noise on the data input D and the inverted data input D' as well as the effects of device variations. To prevent the output node 72 and other nodes in the first amplifier branch from floating, the second amplifier branch 66 is configured to closed in response to the second logical output N2 having the logical state "0." As such, the second switchable discharge path 70 provides the output node 74 with a path to ground and therefore prevents nodes in the first amplifier branch 64 from floating. The SR latch 62 in this embodiment is a NAND SR latch. Therefore in response to the DLO being in the second differential output state of "1/0," the SR latch 62 is configured to generate the data output Q having a logical state of "0" and the inverted data output Q' having a logical state "1." Note therefore that during the evaluation state, the logical state of data output Q is the same as the logical state of the data input D and the logical state of inverted data output Q' is the same as the logical state of the inverted data input D'.

Accordingly, these switchable discharge paths 68, 70 quickly pull down their respective output node 72, 74 of their respective amplifier branch 64, 66 thereby preventing the output nodes 74, 72 in the other amplifier branch 66, 64 from floating. As such, the switchable discharge paths 68, 70 also help increase operating speeds.

The differential sense amplifier DSA is configured to generate the differential logical output DLO in accordance with the data input D and the inverted data input D'. In this embodiment, the differential sense amplifier DSA includes the transistors M1-M11. Each of the transistors M1-M11 is a field effect transistor (FET), such as a Complementary Metal-Oxide-Semiconductor (CMOS) transistor. However, the present invention is not limited thereto and other types of transistors, such as other types of FETs, may be utilized.

The first amplifier branch 64 is formed by transistors M1, M3, M5, M9. The transistors M1, M3 are a pair of pull-pull transistors. The first switchable discharge path 68 includes an inverter gate 78 and a transistor M7. The first switchable discharge path 68 is connected to the first amplifier branch 64 so as to discharge the output node 72 when the first switchable discharge path 68 is closed. Likewise, the second amplifier branch 66 is formed by transistors M2, M4, M6, M3. The transistors M2, M4 are a pair of push-pull transistors. The second switchable discharge path 70 includes an inverter gate 80 and a transistor M8. The second switchable discharge path 70 is connected to the second amplifier branch 66 so as to discharge the output node 74 when the first switchable discharge path 68 is closed. The SR latch 62 has a first input terminal S connected to an output node 72 of the first amplifier branch 64 and a second input terminal R connected to an output node 74 of the second amplifier branch 66. As explained above, based on the differential logical output DLO at the output nodes 72 and 74, the SR latch 62 operates to provide the data output Q and an inverted data output Q', which is inverted with respect to the data output Q.

To time the operation of the DSFF 60, the DSA includes the transistors M9, M3, M11. Each transistor M9, M3 is a PFET. The transistor M11 is an NFET. A drain of the transistor M9 is connected to the output node 72, a gate of the transistor M9 is connected to receive the clock signal CLK, a source of the transistor M9 is connected to receive the supply voltage VD. A drain of the transistor M3 is connected to the output node 74, a gate of the transistor M3 is connected to receive the clock signal CLK, and a source of the transistor M3 is connected to receive the supply voltage VD. A source of the transistor M11 is connected to ground, a gate of the transistor M11 is connected to receive the clock signal CLK, and a drain of the transistor M11 is connected to receive the isolated control node 76.

With respect to the first amplifier branch 64, each of the transistors M1, M7 is a P-channel field effect transistor (PFET). Each of the transistors M1, M9 also has a source coupled to receive a supply voltage VD and a drain coupled to the output node 72. A gate of the transistor M1 is coupled to the output node 74 of the second amplifier branch 66 and is thus configured to receive the second logical output N2 from the second amplifier branch 66 as feedback. A gate of the transistor M9 is coupled to receive the clock signal CLK. Thus, the transistors M1, M9 are each configured to drive the output node 72 near a DC voltage level of the supply voltage VD when activated. As such, the transistors M1, M9 drive the logical output N1 at the output node 72 to a logical "1" when activated, as explained in further detail below. Each of the transistors M3, M5 is an N-channel field effect transistor (NFET). A drain of the transistor M5 is coupled to the output node 72, and a source of the transistor M5 is coupled to a drain of the transistor M3. A source of the transistor M3 is coupled to an isolated control node 76. The isolated control node 76 is connected to the transistor M11. More specifically, the transistor M11 is an NFET. A drain of the transistor M11 is connected to the isolated control node 76 and the source of the transistor M11 is connected to ground. The transistor M3 and the transistor M5 therefore form a third switchable discharge path 82 connected so as to discharge the output node 72 when closed. When either or both of the transistor M3 or the transistor M5 are deactivated, the third switchable discharge path 82 is open.

However, when both the transistors M3, M5 are activated the third switchable discharge path 82 is closed. Note that the gate of the transistor M5 is configured to receive the data input D and a gate of the transistor M3 is configured to receive the second logical output N2 from the second amplifier branch 66 as feedback. A gate of the transistor M11 is configured to receive the clock signal CLK. When all the logical states of the data input D, the second logical input N2 and the clock signal CLK are at logical state of "1", the third switchable discharge path 82 is closed and the output node 72 is discharged and pulled near ground.

Note that in this embodiment, the transistor M5 (which receives the data input D) is stacked between the pair of push-pull transistors M1, M3. Furthermore, the closing of the first switchable discharge path 68 quickly discharges the output node 72. This prevents the output node 74 from floating and thereby quickly prevents the transistor M3 from floating. As such by providing the transistor M5 between the push-pull transistors M1, M3, the output node 72 is prevented from being charged by leakage currents even if the data input D received by the transistor M5 changes after a leading edge of the clock signal CLK. This not only increases the speed of the first amplifier branch 64 but also makes the first amplifier branch 64 less subject to noise.

The transistor M5 of the third switchable discharge path 82 has a drain connected to the output node 72 and a source connected to the isolated control node 76. Thus the third switchable discharge path 82 is connected between the output node 72 and the isolated control node 76. The inverter gate 78 has an input terminal connected to receive the first logical output N1 as feedback from the output node 72. A gate of the transistor M7 is connected to an output terminal of the inverter gate 78. Accordingly, the transistors M3, M5, M7 drive the first logical output N1 to the logical state "0" when activated.

Note that the gate of the transistor M1 and the gate of the transistor M3 are coupled to the output node 74 of the second amplifier branch 66 and are thus also configured to receive the logical output N2 from the second amplifier branch 66. The gate of the transistor M5 is coupled to receive the data input D. In this manner, the first amplifier branch 64 forms a first NAND gate, where the isolated control node 76 can be considered an input node and the gate of the transistor M1 can be considered as another input node. The output node 72 provides the output node of the first NAND gate.

With respect to the second amplifier branch 66, each of the transistors M2, M8 is a P-channel field effect transistor (PFET). Each of the transistors M2, M3 also has a source coupled to receive a supply voltage VD and a drain coupled to the output node 74. A gate of the transistor M2 is coupled to the output node 72 of the first amplifier branch 64 and is thus configured to receive the first logical output N1 from the first amplifier branch 64 as feedback. A gate of the transistor M3 is coupled to receive the clock signal CLK. Thus, the transistors M2, M3 are each configured to drive the output node 74 near a DC voltage level of the supply voltage VD when activated. As such, the transistors M2, M3 drive the logical output N2 at the output node 74 to a logical "1" when activated, as explained in further detail below. Each of the transistors M4, M6 is an N-channel field effect transistor (NFET). A drain of the transistor M6 is coupled to the output node 74, and a source of the transistor M6 is coupled to a drain of the transistor M4. The transistor M4 and the transistor M6 therefore form a fourth switchable discharge path 84 connected so as to discharge the output node 74 when closed. When either or both of the transistor M4 or the transistor M6 are deactivated, the fourth switchable discharge path 84 is open.

However, when both the transistors M4, M6 are activated the fourth switchable discharge path 84 is closed. Note that the gate of the transistor M6 is configured to receive the inverted data input D' and a gate of the transistor M4 is configured to receive the first logical output N1 from the first amplifier branch 64 as feedback. The gate of the transistor M11 is configured to receive the clock signal CLK. When all the logical states of the inverted data input D', the first logical input N1 and the clock signal CLK are at logical state of "1", the fourth switchable discharge path 84 is closed and the output node 74 is discharged and pulled near ground.

Note that in this embodiment, the transistor M6 (which receives the inverted data input D') is stacked between the pair of push-pull transistors M2, M4. Furthermore, the closing of the second switchable discharge path 70 quickly discharges the output node 74. This prevents the output node 72 from floating and thereby quickly prevents the transistor M4 from floating. As such by providing the transistor M6 between the push-pull transistors M2, M4, the output node 74 is prevented from being charged by leakage currents even if the inverted data input D' received by the transistor M6 changes after a leading edge of the clock signal CLK. This not only increases the speed of the second amplifier branch 66 but also makes the second amplifier branch 66 less subject to noise.

The transistor M6 of the fourth switchable discharge path 84 has a drain connected to the output node 74 and a source connected to the isolated control node 76. Thus the fourth switchable discharge path 84 is connected between the output node 74 and the isolated control node 76. The inverter gate 80 has an input terminal connected to receive the second logical output N2 as feedback from the output node 74. A gate of the transistor M8 is connected to an output terminal of the inverter gate 78. Accordingly, the transistors M4, M6, M8 drive the second logical output N2 to the logical state "0" when activated.

Note that the gate of the transistor M2 and the gate of the transistor M4 are coupled to the output node 72 of the first amplifier branch 64 and are thus also configured to receive the logical output N1 from the first amplifier branch 64. The gate of the transistor M6 is coupled to receive the inverted data input D'. In this manner, the second amplifier branch 66 forms a second NAND gate, where the isolated control node 76 can be considered an input node and the gate of the transistor M2 can be considered as another input node. The output node 74 provides the output node of the second NAND gate.

The DSFF 60 of FIG. 5 operable in a reset state and an evaluation state. The DSFF 60 cycles through the reset state and the evaluation state in accordance the clock signal CLK. More specifically, in order to enter the reset state, the clock signal CLK is set to a high voltage state corresponding to a logical state of "0." As a result, the transistor M9 and the transistor M3 are both activated, and the transistor M11 is deactivated. Therefore, the isolated control node 76 cannot be discharged through transistor M11.

The transistors M1 and M3 are activated, and the transistors M3, M4, M7, M8, M11 are deactivated. The third switchable discharge path 82 (formed by the transistors M3, M5 in the first amplifier branch 64) and the fourth switchable discharge path 84 (formed by the transistors M4, M6 in the second amplifier branch 66) are thus both open. Furthermore, the first switchable discharge path 68 formed by the inverter gate 78, transistor M7 in the first amplifier branch 64 and the second switchable discharge path 70 formed by the transistors M4, M6 in the second amplifier branch 66 are thus both open. Therefore, the output node 72 and the output node 74 are prevented from are prevented from being discharged during the reset state. Furthermore, the transistors M9 is configured to pull the output node 72 of the first amplifier branch 64 near the DC supply voltage level of the supply voltage VD in response the clock signal being "0." Accordingly, the first logical output N1 is provided at a logical state of "1" since the output node 72 is charged to a high voltage state (i.e., near a DC voltage magnitude of the supply voltage VD) during the reset state. Likewise, and the transistor M3 is configured to pull the output node 74 of the second amplifier branch 66 near the DC supply voltage level of the supply voltage VD in response to the clock signal being at a logical state of "0." Thus, the second logical output N2 is also provided at logical state of "1" since the output node 74 is charged to a high voltage state (i.e., near a DC voltage magnitude of the supply voltage VD) during the reset state. The differential logical output DLO is thus set to a precharge state of "1/1" during the reset state. The SR latch 62 therefore is configured to hold the data output Q and the inverted output Q'. Once the reset state is complete, the transistors M3, M4, M9, and M3, M11 are deactivated, and the remaining transistors M1 and M2 are activated. At this point, the DSFF 60 is primed for evaluation.

On the rising edge of the clock signal CLK, the DSFF 60 transitions to the evaluation state. The DSFF 60 is maintained in the evaluation state while the non-inverted clock signal CLK is in a clock state of "1" (which in this embodiment corresponds to the first clock state). The differential sense amplifier DSA is configured to set one of the logical outputs N1, N2 to a logical state of "0" and maintain the other one of the logical outputs N2, N1 at a logical state of "1" during the evaluation state. More specifically, the differential sense amplifier DSA is configured to discharge one of the output nodes 72, 74 to a low voltage state (i.e. logical state of "0") and prevent the discharge of the other one of the output nodes 74, 72 so as to maintain the other one of the output nodes in the high voltage state (logical state of "1") during the evaluation state. The differential logic output DLO is thus provided in either a first differential output state (e.g., "1/0") or in a second differential output state (e.g., "0/1") opposite the second differential output state during the evaluation state. This may result in a transition in data output Q and data output Q' of the SR latch 62.

More specifically, as the clock signal CLK rises (i.e. during a positive clock edge); a current race begins between the first amplifier branch 16 and the second amplifier branch 66. During the evaluation state, the transistor M9 and the transistor M3 are both deactivated, and the transistor M11 are both activated by the clock signal being in the logical state "0."

The first amplifier branch 64 wins the current race when the transistor M5 is activated by the data input D being at logical "1," which results in the third switchable discharge path 82 beginning to close and the first logical output N1 to decrease in voltage. As such, the first switchable discharge path 68 is closed and the output node 72 discharges to ground. Furthermore, the gates of the push-pull transistors M2, M4 also have a path to ground. As such, the transistor M4 maintains the second switchable discharge path 70 open and the transistor M2 pulls the output node 74 near the supply voltage VD. The transistor M6 is also deactivated by the inverted data input D' being a logical "0," which also prevents the fourth switchable discharge path 84 from closing. As such, the fourth switchable discharge path 84 remains open. In this case, a conductance at the output node 72 is greater than a conductance at the output node 74.

Likewise, the second amplifier branch 66 wins the current race when the transistor M6 is activated by the inverted data input D' being at logical "1," which results in the second switchable discharge path 70 beginning to close and the second logical output N2 to decrease in voltage. As such, the second switchable discharge path 70 is closed and the output node 74 discharges to ground. Furthermore, the gates of the push-pull transistors M1, M3 also have a path to ground. As such, the transistor M3 maintains the second switchable discharge path 70 open and the transistor M1 pulls the output node 72 near the supply voltage VD. The transistor M5 is also deactivated by the data input D being a logical "0," which also prevents the third switchable discharge path 82 from closing. As such, the third switchable discharge path 82 remains open. In this case, a conductance at the output node 74 is greater than a conductance at the output node 72.

Note that the gate of the transistor M3 is coupled to the output node 72 so as to receive the logical output N2 as feedback from the first amplifier branch 64. Additionally, the gate of the transistor M4 is coupled to the output node 72 so as to receive the logical output N1 as feedback from the first amplifier branch 64. Since both the logical outputs N1, N2 where set to logical state of "1" during the reset state, the gates of both the transistors M3, M4 initially receive a logical state of "1" at the beginning of the evaluation state. Note that the gate of the transistor M2 and the gate of the transistor M4 are coupled to the output node 74 so as to receive the logical output N2 as feedback from the second amplifier branch 66. Since both the logical outputs N1, N2 where set to logical state of "1" during the reset state, the gates of both pairs of push-pull transistors M1, M3, and M2, M4 initially receive a logical state of "1" at the beginning of the evaluation state.

Accordingly, the output node 72, 74 that is provided at logical state of "0" fastest will result in either the transistor M7 or the transistor M8 being activated and either the transistors M3, M5 or the transistors M4, M6 being activated. If the transistors M3, M5 are activated, the third switchable discharge path 82 formed by the transistors M3, M5 and the first switchable discharge path 68 are both closed and the output node 72 is discharged. Accordingly, the logical output N1 is provided at logical state of "0." In response, the transistor M2 is activated to maintain the output node 74 and the logical output N2 at logical state of "1." If the transistors M4, M6 are activated, the fourth switchable discharge path 84 formed by the transistors M4, M6 and the second switchable discharge path 70 are both closed and the output node 74 is discharged. Accordingly, the logical output N2 is provided at logical state of "0." In response, the transistor M1 is activated to maintain the output node 72 and the logical output N1 at logical state of "1."

More specifically, the first amplifier branch 64 wins the current race if the transistor M5 is activated by the data output D being in the logical state "1." In this case, due to a conductance of the first amplifier branch 64 being higher than a conductance of the second amplifier branch 66, the output node 72 discharges faster than the output node 74. The first logical output N1 is thus set to a logical "0" during the evaluation state of the DSFF 60. Since the first switchable discharge path 68 and the third switchable discharge path 82 are both closed, the output node 72 causes the first logical output N1 to activate the transistor M2. Thus, even if the output node 74 starts to discharge, the discharge of the output node 74 is impeded by the transistor M2 (which is activated) thereby resulting in the output node 74 getting quickly pulled back to the high voltage state. Thus, the second logical output N2 is maintained at logical "1." Accordingly, the differential logical output DLO is provided to have a differential output state of "0/1," during the evaluation state when the data input D is at logical "1" and the inverted data input D' is at logical "0."

The second amplifier branch 66 wins the current race if the transistor M6 is activated by the inverted data output D being in the logical state "1." In this case, due to a conductance of the second amplifier branch 66 being higher than a conductance of the first amplifier branch 64, the output node 74 discharges faster than the output node 72. The second logical output N2 is thus set to a logical "0" during the evaluation state of the DSFF 60. Since the second switchable discharge path 70 and the fourth switchable discharge path 84 are both closed, the output node 74 causes the second logical output N2 to activate the transistor M1. Thus, even if the output node 72 starts to discharge, the discharge of the output node 72 is impeded by the transistor M1 (which is activated) thereby resulting in the output node 72 getting quickly pulled back to the high voltage state. Thus, the first logical output N1 is maintained at logical "1." Accordingly, the differential logical output DLO is provided to have a differential output state of "1/0," during the evaluation state when the inverted data input D' is at logical "1" and the data input D is at logical "0."

The switchable discharge paths 68, 70 thereby provide a paths to ground even if the data input D and the inverted data input D' are highly noisy and change logical states. Furthermore, the switchable discharge paths 68, 70 also prevent the output node 72, 74 that is being discharged by their respective amplifier branch 64, 66 from being charged by leakage currents. The switchable discharge paths 68, 70 thereby make the DSFF 60 more robust. The gates of the transistors M7, M8 are driven by the output terminals of the inverter gates 78, 80 while the drains of the transistors M7, M8 are connected to the output node 72, 74 respectively. As such, the transistors M7, M9 each operate in a diode mode when activated and thus do not significantly load the third switchable discharge path 82 and the fourth switchable discharge path 84. Glitches in the amplifier branch 64, 66 being discharged are also reduced or eliminated as the output node 72, 74 that remains charged is prevented from floating. The inverter gates 78, 80 reduce amount of loading the transistors M7, M8 introduce to the output nodes 72, 74 by transistors M3, M4, which helps speed up operating speeds.

The logical outputs Q and Q' of the SR latch 62 are adjusted accordingly by the SR latch 62. The differential logical output DLO includes a first logical output N1 that is received by the input terminal S of the SR latch 62. In this embodiment, the SR latch 62 is an SR latch. The input terminal S is the set terminal of the SR latch 62, and the first logical signal N1 is received at the input terminal S. The differential logical output DLO includes a second logical output N2 that is received by the input terminal R of the SR latch 62. The input terminal N2 is the reset terminal of the SR latch 62, and the second logical output N2 is received at the input terminal R. Note that when the differential logical output DLO is set to the precharge state after the reset state, the SR latch 62 is configured to hold the data output Q and the inverted data output Q'. However, after the evaluation state, the SR latch 62 is configured to set the data output Q to logical state of "1" and the inverted data output Q' to logical state of "0" in response to the differential logical output DLO being provided at the differential output state of "0/1" and to set the data output Q to logical state of "0" and the inverted data output Q' to logical state of "1" in response to the differential logical output DLO being provided at the differential output state of "1/0."

Furthermore, note that after evaluation completes, all nodes in the DSFF 60 have a closed path to either the supply voltage VD or ground. Because of this, the output nodes 72, 74 are latched, and no change in the data input D and the inverted data input D' in either of the first amplifier branch 64 and the second amplifier branch 66 will have any effect on the logical states stored at the output nodes 72, 74 until the beginning of the next evaluation.

In this embodiment, the flip flop 44-1 is configured to generate the clock signal CPO, wherein the clock signal CPO shown in FIG. 5 is the clock signal 50 which is configured to that synchronize the flip flop 44-1 in FIG. 4. In this embodiment, the flip flop 44-1 includes AND logic 86 configured to generate a clock signal CPO. With respect to FIG. 4, the clock signal CPO is the clock signal 50. Thus, as explained below, the DSFF 60 is structurally arranged so that the flip flop 44-1 has a characteristic propagation delay, which approximates the average time delay between the flip flop 44-1 receiving a clock edge of the clock signal CLK and the flip flop 44-1 is configured to provide a corresponding clock edge in the clock signal CPO in response. It should be noted that in this embodiment the AND logic 86 is a NAND gate. Given the arrangement of the flip flop 44-1, the AND logic 86 is configured to generate the clock signal CPO in the first clock state as a result of the clock signal CLK being in the first clock state. Furthermore, the AND logic 86 is configured to generate the clock signal CPO in the second clock state as a result of the clock signal CLK being in the second clock state. However, in alternative embodiments, a different type of logic may be provided, such as an AND gate, so that the clock signal CPO is generated in the second clock state as a result of the clock signal CLK being in the first clock state and so that the clock signal CPO is generated in the first clock state as a result of the clock signal CLK being in the second clock state.

Referring again to the flip flop 44-1 shown in FIG. 1, the flip flop 44-1 is configured to generate the clock signal CPO in the first clock state in response to the flip flop 44-1 becoming transparent. More specifically, the DSFF 60 becomes transparent in response to a positive clock edge of the clock signal CLK and remains transparent while the clock signal CLK is received in the first clock state. The DSFF 60 thus is thus switched from being in the reset state to being in the evaluation state in response to the positive edge of the clock signal CLK. Accordingly, in response to becoming transparent, the differential logical output DLO is provided to be in one of the differential logical states, either a differential output state of "1/0" or "0/1." As explained above, this depends on the logical state of the data input D and the logical state of data input D'. In either case however, the logical state of logical output N1 is inverted with respect to the logical output N2. The DSA is arranged to define a characteristic propagation delay. As such, due to this characteristic propagation delay, a temporal duration between receiving a positive clock edge of the clock signal CLK when the differential logical output DLO is in the precharge state of "1/1" until the differential logical output DLO is provided in one of the differential logical states is on average equal to approximately the characteristic propagation delay. Thus, the differential logical output DLO is provided in one of the differential logical states in response to the DSA becoming transparent.

The AND logic 86 has an input terminal 88 connected to receive the logical output N1 and an input terminal 90 is coupled to receive the logical output N2. As shown in FIG. 5, the AND logic 86 also has an output terminal 92. The AND logic 86 is configured to perform a type of AND operation, which in this case in a NAND operation. As such, the AND logic 86 is configured to provide the clock signal CPO in the first clock state in response to the differential logical output DLO being provided in one of the differential logical states. Thus, while the differential logical output DLO being provided in one of the differential logical states, the AND logic 86 is configured to provide the clock signal CPO at the output terminal 92 in the first clock state. The AND logic 86 is also arranged to define a characteristic propagation delay. As such, due to this characteristic propagation delay, a temporal duration between initially the differential logical output DLO being provided in one of the differential logical states until the AND logic 86 generates a positive clock edge in the clock signal CPO is on average equal to the characteristic propagation delay of the AND logic 86. Thus, the flip flop 44-1 defines a characteristic propagation delay equal to approximately the characteristic propagation delay of the differential sense amplifier DSA plus the characteristic propagation delay of the AND logic 86. Thus, on average, a temporal duration between a positive clock edge of the clock signal CLK and a positive clock edge of the clock signal CPO at the output terminal 92 is equal to approximately the characteristic propagation delay of the flip flop 44-1. The output terminal 92 is directly connected to the input end of the local clock path 52 shown in FIG. 4.

The flip flop 44-1 is configured to generate the clock signal CPO in the second clock state in response to the flip flop 44-1 becoming opaque. More specifically, the DSFF 60 becomes opaque in response to a negative clock edge of the clock signal CLK and remains opaque while the clock signal CLK is received in the second clock state. The DSFF 60 thus is thus switched from being in the evaluation state to being in the reset state in response to the negative edge of the clock signal CLK. Accordingly, in response to becoming opaque, the differential logical output DLO is provided to in the precharge state of "1/1." As explained above, the differential logical output DLO is in the precharge state of "1/1" regardless of the logical state of the data input D or the logical state of data input D'. Thus, the logical state of logical output N1 and of the logical output N2 are both at logic "86. Due to the characteristic propagation delay of the DSA, a temporal duration between receiving a negative clock edge of the clock signal CLK when the differential logical output DLO is in one of the differential logical states until the differential logical output DLO is provided in the precharge state is on average equal to approximately the characteristic propagation delay of the DSA. Thus, the differential logical output DLO is provided in the precharge state in response to the DSA becoming transparent.

Again, the AND logic 86 is configured to perform a type of AND operation, which in this case in the NAND operation. As such, the AND logic 86 is configured to provide the clock signal CPO in the second clock state in response to the differential logical output DLO being provided in the precharge state of "1/1." Thus, while the differential logical output DLO is being provided in the precharge state, the AND logic 86 is configured to provide the clock signal CPO at the output terminal 92 in the second clock state. Due to the characteristic propagation delay of the AND logic 86, a temporal duration between initially providing the differential logical output DLO in the precharge state until the AND logic 86 generates a negative clock edge in the clock signal CPO is on average equal to the characteristic propagation delay of the AND logic 86. Thus, on average, a temporal duration between a negative clock edge of the clock signal CLK and a negative clock edge of the clock signal CPO at the output terminal 92 is equal to approximately the characteristic propagation delay of the flip flop 44-1. As such, the flip flop 44-1 is configured to generate the clock signal CPO so that a clock skew between the clock signal CLK and the clock signal CPO at the output terminal 92 is on average equal to the characteristic propagation delay of the flip flop 44-1.

Again, in this embodiment, the clock skew between the clock signal CPO and the clock signal CLK at the input end of the local clock path 52 is on average approximately equal to the characteristic propagation delay of the flip flop 44-1. Thus, a temporal distance between a negative clock edge in the clock signal CLK and a negative clock edge of the clock signal CPO is also on average approximately equal to the characteristic propagation delay.

Figure 6:
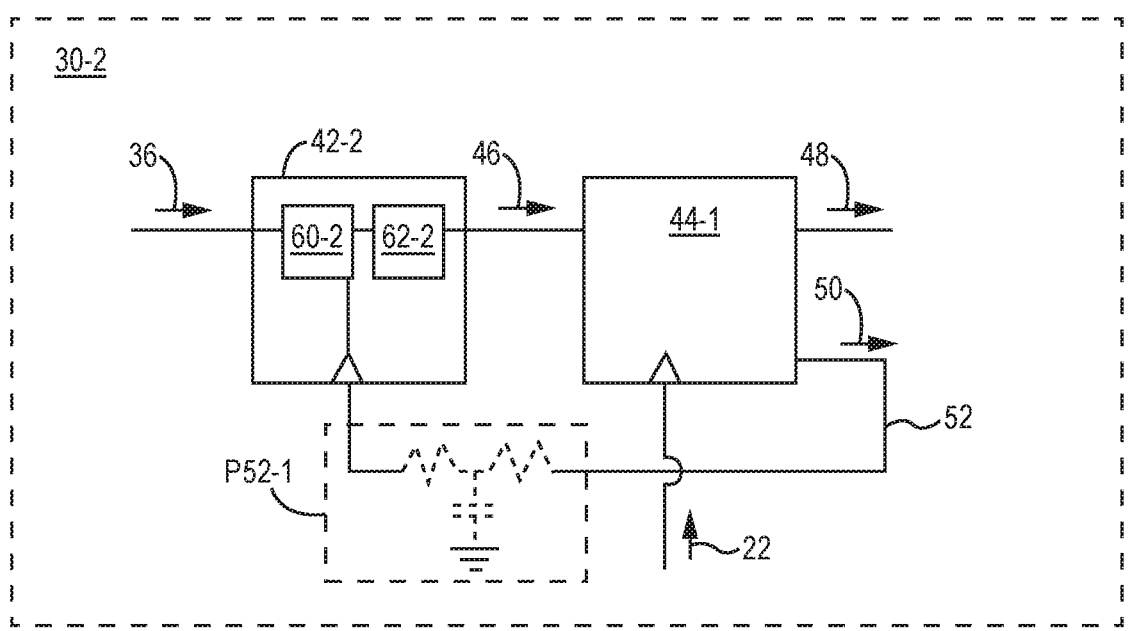
FIG. 6 illustrates another type of sequential state circuit that may be provided as the sequential state circuit shown in FIG. 1 where both the first flip flop and the second flip flop are KVFFs.

FIG. 6 illustrates another embodiment of the sequential state circuit 30-2 that includes a flip flop 42-2 along with the flip flop 44-1. The flip flop 44-1 is identical to the flip flop 44-1 shown in FIG. 4 and in FIG. 5. The flip flop 42-2 is another type of flip flop which may be provided as the flip flop 42 shown in FIG. 1. A circuit diagram of the flip flop 42-2 is described by FIG. 5 where the flip flop 42-2 also includes a DSFF 60-2 that is identical to the DSFF 12 shown in FIG. 5 and includes an SR latch 62-2 that is identical to the SR latch shown in FIG. 5. However, the flip flop 42-2 does not generate a clock signal CPO and therefore does not include the AND logic 1 shown in FIG. 5. Furthermore, with respect to the flip flop 42-2 shown in FIG. 6 and described by FIG. 5, the data input D shown in FIG. 5 would be the data input 36, the clock signal CLK shown in FIG. 5 would be the clock signal 50, and the logical output Q would be the logical output 46. Otherwise, the flip flop 42-2 operates in the same manner described above with respect to FIG. 5. With respect to the flip flop 44-1 shown in FIG. 6, the clock signal 22 is a global clock signal. However, in alternative embodiments, the clock signal 22 received by the flip flop 44-1 may be a clock signal, like the clock signal CPO, but generated from another flip flop (not explicitly shown in FIG. 6) outside of the sequential state circuit 30-2 and substantially identical to the flip flop 44-1.

Figure 7:
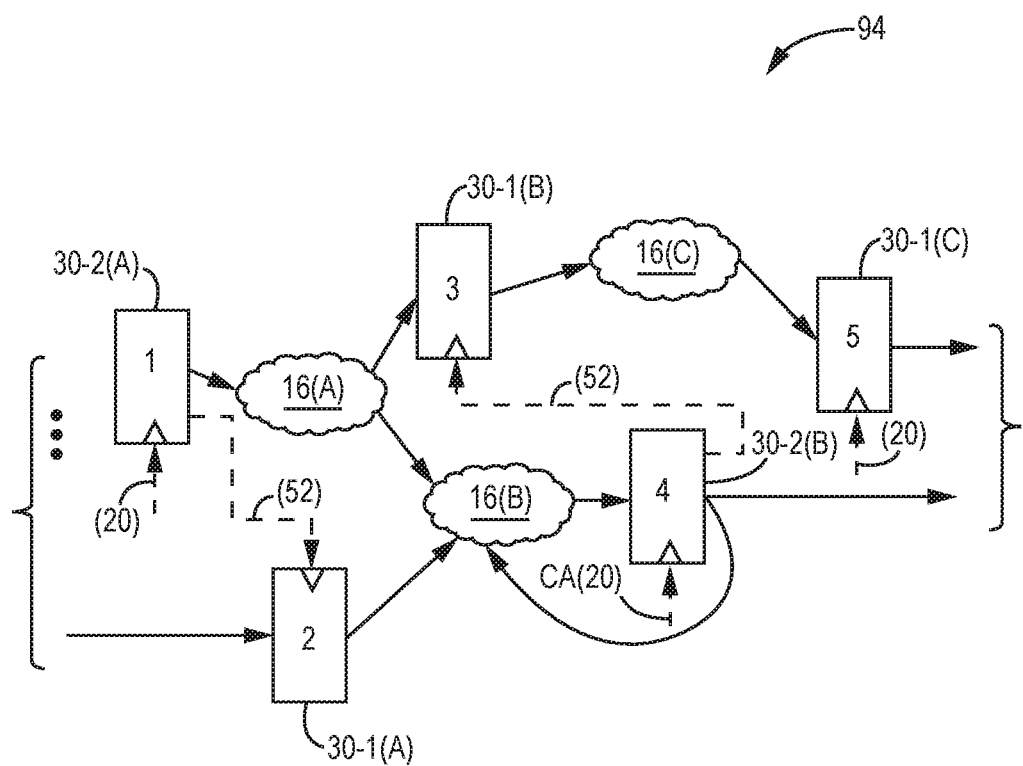
FIG. 7 is a visual representation of one embodiment of an in silico digital synchronous circuit.

FIG. 7 is a visual representation of an in silico digital synchronous circuit 94 that provides a computer model of a digital circuit within a computer aided design (CAD) package. The in silico digital synchronous circuit 94 has in silico CLCs 16(A), 16(B), and 16(C), and in silico sequential state circuits 30-1(A), 30-1(B), 30-1(C), 30-2(A), 30-2(B). Each in silico CLC 16(A), 16(B), 16(C) is configured to provide CAD model a different combinational logic circuit. The in silico sequential state circuits 30-1(A), 30-1(B), 30-1(C) each provide a CAD model that simulates and describes the sequential state circuit 30-1 shown in FIG. 4. The in silico sequential state circuits 30-2(A), 30-2(B) each provide a CAD model with the arrangement shown the sequential state circuit 30-2 shown in FIG. 6. The data arcs which are visually represented as solid lines having an arrow head indicating direction of data flow. The in silico digital synchronous circuit 94 defines also defines clock arcs, which are visually presented in FIG. 7 as dotted lines having an arrow head indicating direction of clock flow. In FIG. 7, every global clock arch is identified as (20) and each local clock arch with a (52). The in silico digital synchronous circuit 94 may include a directed graph that describes graph nodes of the where an integer [1,2,3,4,5] indicate a position of the in silico sequential state circuits [30-2(A), 30-1(A), 30-1(B), 30-2(B), 30-1(C)] respectively.

Figure 8:
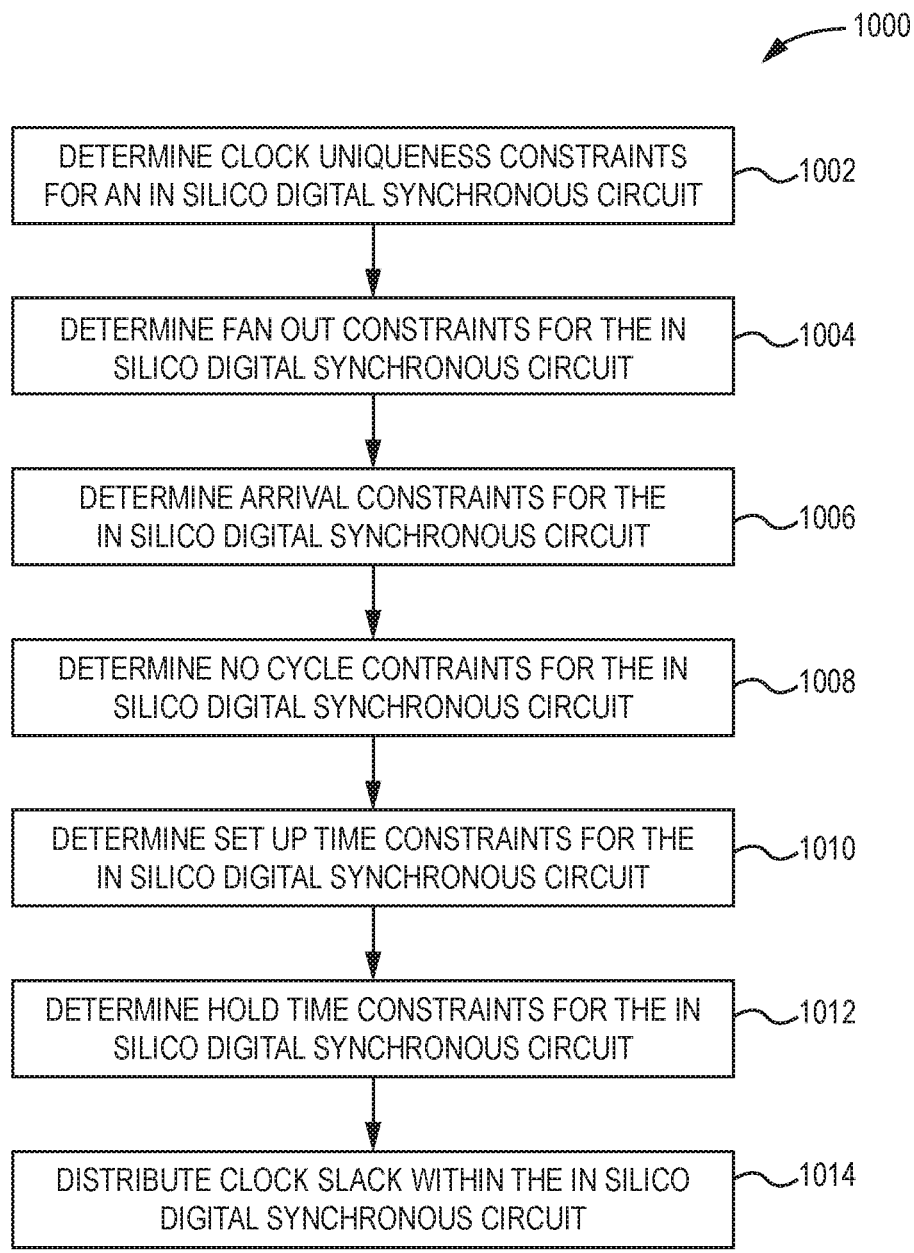
FIG. 8 illustrates one embodiment of a method providing clock optimization for the in silico digital synchronous circuit.

Referring now to FIG. 7 and FIG. 8, FIG. 8 describes one embodiment of a clock optimization method 1000 for the in silico digital synchronous circuit 94 described in FIG. 7. The clock optimization method 1000 described in FIG. 8 can be implemented by a computer system executing a CAD software package that simulates and describes the properties of an IC having the in silico digital synchronous circuit 94.

This clock optimization method 1000 may be implemented to design an in silico clock network and thus includes a clock graph. Note that the clock graph is different from the in silico flip flop graph, which denotes data dependencies between in silico flip flops, described previously. The clock graph may not have cycles; that is, there cannot exist a set of in silico flip flops each of which receives clock from in silico flip flop in the same set. Therefore, the no cycle constraints are encoded as follows.

The clock optimization method finds optimal placement of sources and targets. Subsequently wiring is determined. In this embodiment, the clock optimization method implements an integer linear programming (ILP) as described herein. The in silico flip flop sources Y in FIG. 7 provides local clocking to the target in silico flip flop X, and in silico flip flop X feeds data input to the in silico flops Y. The skewed clock can be used for two main purposes, to reduce combinational power by introducing slacks on critical paths and to eliminate hold-time violations for short paths. The clocking is formulated as an ILP problem that is found to be efficient for practical circuits such as pipelined arithmetic datapath circuits. A considerable reduction in the dynamic power from clocking is demonstrated on several large sequential circuit blocks.

More specifically, nodes of the directed graph can be represented as graph G=(N, A), where N denotes the set of nodes and A is the set of arcs (directed edges). Each in silico flip flop R, in the circuit is a node in this graph. There is a directed edge $(R_i, R_j)$ if there is a directed combinational path starting from the in silico flip flop $R_i$, and ending at the in silico flip flop $R_j$.

For any in silico flip flop $R_i$ assume that,

1. $A_i$ denotes arrival of clock (whether local or global) at in silico flip flop $R_i$.
2. $E_i$ denotes the delay from input clock (CLK) to output clock (CPO).
3. $S_i$ denotes setup time.
4. $H_i$ denote the hold time.
5. $T_i$ denotes the clock-to-output delay.
6. $D_{i,j}$ the denotes the maximum combinational path delay from in silico flip flop $R_i$ to in silico flip flop $R_j$.
7. $d_{i,j}$ denotes the minimum combinational path delay from in silico flip flop $R_i$ to in silico flip flop $R_j$.
8. P is the clock period of the circuit.

The following indicator variables are the decision variables of this formulation.

$$x_{i,j} = \begin{cases} 1 \\ 0 \end{cases} \text{If } R_i \text{ is clocked by the output clock of } R_j, \text{otherwise}$$

As shown in FIG. 8, initially the CAD tool determines clock uniqueness constraints for the in silico digital synchronous circuit 94 (procedure 1002). More specifically], the in silico flip flop $R_i$ receives clock from at most one other in silico flip flop.

$$\forall i, \sum_{j=1}^{n} x_{i,j} \leq 1 \qquad (1)$$

Note that if $R_i$ does not receive clock from any in silico flip flop $R_j$, that is, $$\sum_{j=1}^{n} x_{i,j} = 0,$$

then it is clocked by the global clock by default.

Next, the CAD tool determines clock fan-out constraints for the in silico digital synchronous circuit 94 (procedure 1004). As such, in silico flip flop can provide clock to at most a fixed number of in silico flip flops of the sequential state circuits. This fan-out bound depends on several parameters, such as process technology and size of the circuit. In this formulation, the clock fan-out is fixed to be at most 1.

$$\forall j, \sum_{j=1}^{n} x_{i,j} \leq 1 \qquad (2)$$

The CAD tool then determines arrival constraints for the in silico digital synchronous circuit 94 (procedure 1006). When a in silico flip flop R, is locally clocked by a in silico flip flop $R_j$, the arrival of clock at R, depends on the arrival of clock at in silico flip flop $R_j$ and the delay of in silico flip flop $R_j$ in producing output clock.

$$\forall i, A_i \sum_{j=1}^{n} x_{i,j} \cdot (A_j + E_j) \qquad (3)$$

Let $y_{i,j} = x_{i,j} \cdot (A_j + E_j)$ and indicate the timing relationship between arrivals of the clocks. But these would be nonlinear constraints. They can be made linear using the following additional set of constraints. Let u denote the upper bound on the arrival times of the in silico flip flops. u can be suitably chosen depending on the latency (arrival) constraints of the circuit.

$$\forall i, j, \ y_{i,j} \leq u \cdot x_{i,j} \qquad (4)$$

$$\forall i, j, \ y_{i,j} \leq A_j + E_j \qquad (5)$$

$$\forall i, j, \ y_{i,j} \geq A_j + E_j - u \cdot (1 - x_{i,j}) \qquad (6)$$

$$\forall i, j, \ y_{i,j} \geq 0 \qquad (7)$$

We can verify that when $x_{i,j} = 0$, $y_{i,j} = 0$ for a given i and j values. Similarly, when $x_{i,j} = 1$, $y_{i,j} = (A_j + E_j)$. No cycle constraints ensure that a given $A_i$ is never a function of itself.

The CAD tool then determines no cycle for the in silico digital synchronous circuit 94 (procedure 1008). As such, the variables denote an adjacency matrix of a directed graph. This directed graph shows the clocking relationship between the in silico flip flops and is referred to as the clock graph. Note that the clock graph is different from the in silico flip flop graph, which denotes data dependencies between in silico flip flops, described previously. The clock graph cannot have cycles; that is, there cannot exist a set of in silico flip flops each of which receives clock from in silico flip flop in the same set. Therefore, the no cycle constraints are encoded as follows.

Let $L_i$ denote an index in the topological ordering of the in silico flip flops. Note that a valid topological order exists for a directed graph with no cycles (DAG).

$$\forall (i, j), \ L_i \geq x_{i,j} \cdot L_j + \epsilon \qquad (8)$$

In the presence of a cycle of in silico flip flops (remember that an edge in this cycle indicates clocking relationship and not data relationship), such as $R_1 \to R_2 \to R_3 \to R_4 \to R_1$. We have an inconsistency $L_1 > L_2 > L_3 > L_4 > L_1$; that is, $L_1$ is strictly greater than itself. $L_i$ variables have a valid assignment if and only if there is no cycle in the clock graph.

Note that $M_{i,j} = x_{i,j} \cdot L_j$ a non-linear quantity. We can linearize these constraints as follows. Let v denote the upper bound on the values of $L_i$ variables. Given a graph of n in silico flip flops, this upper bound is any constant $>(n+1) \cdot \epsilon$.

$$\forall i, j, \ M_{i,j} \leq v \cdot x_{i,j} \qquad (9)$$

$$\forall i, j, \ M_{i,j} \leq L_j + \epsilon \qquad (10)$$

$$\forall i, j, \ M_{i,j} \geq L_j + \epsilon - v \cdot (1 - x_{i,j}) \qquad (11)$$

$$\forall i, j, \ M_{i,j} \geq 0 \qquad (12)$$

The CAD tool then determines set up time constraints for the in silico digital synchronous circuit 94 (procedure 1010). Given a pair of in silico flip flops $(R_i, R_j) \in A$ of the in silico flip flop graph, the setup constraints can be modeled by calculating the required and arrival times at the in silico flip flop $R_j$ and ensuring the required time is higher than the arrival time. For a register-to-register path between registers $R_i$ and $R_j$, the arrival time of data at $R_j$ is calculated as $A_i + T_i + D_{i,j}$. The required time at register $R_j$ is calculated as $A_j - S_j + P$. Setup time constraints are satisfied when $$A_i + T_i + D_{i,j} \leq A_j - S_j + P \qquad (13)$$

Rearranging the foregoing inequality, the setup constraints are stated as follows:

$$A_i - A_j \leq P - T_i - D_{i,j} - S_j \qquad (14)$$

The term $P - T_i - D_{i,j} - S_j$ denotes the setup slack available on the path from $R_i$ to $R_j$. These setup time slacks can be obtained from any commercial synthesis tool for a given pair of in silico flip flops.

The CAD tool then determines hold time constraints for the in silico digital synchronous circuit 94 (procedure 1012): The hold-time constraints for a pair of in silico flip flops $(R_i, R_j) \in A$ of the in silico flip flop graph are as follows.

$$A_i - A_j \geq H_j - T_i d_{i,j} \qquad (15)$$

Finally, the CAD tool distributes clock slack within the in silico digital synchronous circuit 94 (procedure 1014). The objective function is to maximize the slack imparted to the largest cones of logic. Therefore, the goal is to maximize the total area of the cones rooted at the in silico flip flops that can receive SygnalC clocks. Let F, denote the size of the cone of logic driving a in silico flip flop $R_i$. Note that the $F_i$ are known constants. The objective used in the technique of the present disclosure is as follows.

$$\text{Max.} \sum_{i=1}^{n} F_i \left( \sum_{j=1}^{n} x_{i,j} \right) \qquad (16)$$

One needs to be careful about situations in which a solver might produce a lot of clocks for in silico flip flops with small logic cones as opposed to a few with in silico large combinational cones. The latter is more beneficial because it reduces more logic area under slack while simultaneously reducing the layout burden of extra clock wires. To make sure the solutions of these types are produced, the objective function to the in silico flip flops the in silico combinational logic cones which are large enough to be be restricted.

Alternatively, an objective function can be used if the goal is to minimize the probability of hold-time violations in the circuit. The short paths (denoted as pairs of in silico flip flops $(R_i, R_j)$) can be assigned weights depending on the probability of observing a hold-time violation on them. If the probability of observing a hold-time violation on a modeled path is high, then the weight of the path is larger. This weight is also an indicator of the number of buffers required on the path to remove the violation. If these weights are denoted as $W_{i,j}$ (known constants), then an alternate objective function to maximize the total weight of all the paths is as follows. This objective ensures that very few short paths remain that need to be buffered to fix hold-time violations on them.

$$\text{Max.} \sum_{i=1}^{n} \sum_{j=1}^{n} w_{i,j} \cdot x_{i,j} \qquad (17)$$

Experiments were conducted on several complex circuit blocks. These include a 64-bit signed integer multiplier, a 28-bit 4-tap finite impulse response (FIR) filter, and a 32-bit simplified microprocessor without interlocked pipeline stages (MIPS) processor. Unlike the filter and the MIPS processor, the 64-bit multiplier was pipelined and provided an opportunity to explore throughput versus power by varying the number of pipeline stages. The number of stages was varied from K=0 to K=5. K=0 denotes the circuit with only input and output in silico flip flops. Also, beyond five stages, the conventional design showed no improvement in throughput while consuming greater energy.

In one exemplary embodiment, the in silico digital synchronous circuit 94 is synthesized by a Cadence RTL compiler using a commercial 65 nm LP cell library, that includes model archetypes of the sequential state circuits 30-1, 30-2 along with their corresponding flip flops. They were then placed and routed using Cadence Encounter, at the respective peak frequency of the conventional design, that is, the one with only conventional DFFs. Estimates of power were obtained using PrimeTime, with fully extracted post-layout netlists. Table 1 shows the advantages in terms of power, area, and delay after automated place and route tools using Cadence Encounter compared with the conventional models of a globally clocked digital synchronous circuit.

TABLE 1

| Parameter | Area | Power | Leakage | Total circuit cap |
|---|---|---|---|---|
| Globally clocked | 127,410 μm² | 163.7 mW | 13.3 μW | 264 pF |
| Locally clocked | 84,698 μm² | 90.8 mW | 6.6 μW | 156.3 pF |
| Δ (%) | 33% | 44% | 50% | 40% |

The main advantage in this particular example are the area and power reduction of the combinational logic under additional slack provided by the delayed local clocking. The problem of reducing gate sizes under timing slack is a well-studied problem and is heavily utilized in most commercial synthesis and automated layout tools. Note that the clock period of the circuit was not changed; that is, both the circuits (original and locally clocked) were processed at the same clock period, which was 2.6 ns.

Since the in silico flip flops X (i.e., target in silico flip flops) are modeled to receive local clocking, the total capacitance driven by the global clock tree reduces. Note that this does not reduce the total power of the clock tree, but local clocking definitely does not increase the burden on the existing clock tree but rather alleviates it slightly.

In this particular example, the in silico flip flops Y (i.e., source in silico flip flops) are modeled to produce an output clock trigger after it has finished latching its D-input. The modeled clock signal that triggers in silico flip flop X is therefore hazard free; that is, it does not overwrite the data bit latched by in silico flip flop Y. This is the main advantage of the clock generated using completion detection. With this clock optimization method, the modeled local clock path between the in silico flip flop X to in silico flip flop Y clocking can potentially eliminate hold-time violations and clock/data skews in such cases.

Those skilled in the art will recognize improvements and modifications to the preferred embodiments of the present disclosure. All such improvements and modifications are considered within the scope of the concepts disclosed herein and the claims that follow.

What is claimed is:

1. A digital synchronous circuit comprising:
a first flip flop operable to receive a first clock signal, wherein the first flip flop is configured such that the first flip flop is synchronized to be transparent and to be opaque in accordance with the first clock signal; and
a second flip flop operable to receive a second clock signal, wherein the second flip flop is configured such that the second flip flop is synchronized to be transparent and to be opaque in accordance with the second clock signal and wherein the second flip flop is configured to generate the first clock signal such that the second flip flop provides the first clock signal in a first clock state in response the second flip flop becoming transparent and provides the first clock signal in a second clock state in response the second flip flop becoming opaque;
wherein the first flip flop is configured to generate a first logical output such that the first flip flop is configured to set up the first logical output while the first flip flop is transparent and to hold the first logical output while the first flip flop is opaque, and the second flip flop comprises a first differential sense amplifier configured to generate a first differential logical output in a precharge state while the second clock signal is in the first clock state and is configured to generate the first differential logical output in a variable differential logical state while the second clock signal is in the second clock state, and
wherein the second flip flop is configured to generate a second logical output such that the second flip flop is configured to set up the second logical output while the second flip flop is transparent and to hold the second logical output while the second flip flop is opaque, and the second flip flop is further configured to generate the first clock signal in the first clock state in response to the first differential logical output being in the precharge state and is configured to generate the first clock signal in the second clock state in response to the first differential logical output being in the variable differential logical state.

2. The digital synchronous circuit of claim 1 wherein the second clock signal is a global clock signal.

3. The digital synchronous circuit of claim 1 further comprising a sequential state circuit that includes the first flip flop, the second flip flop, and a local clock path connected between the first flip flop and the second flip flop so that the first flip flop is operable to receive the first clock signal from the second flip flop along the local clock path.

4. The digital synchronous circuit of claim 3 further comprising a global clock tree, wherein the second flip flop is configured to receive the second clock signal as a global clock signal from the global clock tree.

5. The digital synchronous circuit of claim 4 wherein:
the second flip flop defines a characteristic propagation delay; and
the local clock path defines a characteristic path delay;
wherein the first flip flop is configured to receive the first clock signal such that a clock skew between the first clock signal and the second clock signal is approximately equal to an aggregation of the characteristic propagation delay and the characteristic path delay.

6. The digital synchronous circuit of claim 1 wherein the second flip flop is configured to generate the first clock signal so as to provide a clock skew between the first clock signal and the second clock signal.

7. The digital synchronous circuit of claim 1 further comprising a first combinational logic cone wherein:
the first flip flop is configured to receive a first data input generated by the first combinational logic cone; and
the first flip flop is configured to be transparent so as to set up the first logical output in accordance with the first data input while the first clock signal is in the first clock state.

8. The digital synchronous circuit of claim 1 wherein the second flip flop further comprises AND logic configured to receive the first differential logical output and generate the first clock signal in the first clock state in response to the second logical output being set up and to generate the first clock signal in the second clock state in response to the second clock signal being held.

9. The digital synchronous circuit of claim 1 wherein the first differential sense amplifier defines a first characteristic propagation delay and AND logic defines a second characteristic propagation delay such that the second flip flop generates the first clock signal such that a clock skew between the first clock signal and the second clock signal is approximately equal to the first characteristic propagation delay and the second characteristic propagation delay.

10. The digital synchronous circuit of claim 8 wherein the second flip flop further comprises an SR latch configured to receive the first differential logical output and generate the second logical output so that the second logical output is set up while the second clock signal is in the first clock state and the second logical output is held while the second clock signal is in the second clock state.

11. The digital synchronous circuit of claim 1 wherein the first flip flop comprises the first differential sense amplifier configured to generate the first differential logical output in the precharge state and in the variable differential logic state.

12. The digital synchronous circuit of claim 11 wherein the first flip flop comprises an SR latch configured to receive the first differential logical output and generate the first logical output so that the first logical output is set up while the first clock signal is in the first clock state and the first logical output is held while the second clock signal is in the second clock state.

13. The digital synchronous circuit of claim 1 wherein the second flip flop is configured to receive the first logical output from the first flip flop as a first data input and the second flip flop is configured to be transparent so as to set up the second logical output in accordance with the first logical output while the second clock signal is in the first clock state.

14. The digital synchronous circuit of claim 1 wherein the first flip flop is a D flip flop.

15. The digital synchronous circuit of claim 1 wherein the digital synchronous circuit is operable in a normal mode and in a scan mode.

16. The digital synchronous circuit of claim 15 further comprising a first combinational logic cone and wherein:
the first flip flop is configured to generate the first logical output such that the first flip flop is configured to set up the first logical output while the first flip flop is transparent and hold the first logical output while the first flip flop is opaque; and
the first flip flop is configured to receive a first data input generated by the combinational logic cone in the normal mode and is configured to receive a global test input in the scan mode.

17. The digital synchronous circuit of claim 16 wherein:
the second flip flop is configured to generate the second logical output such that the second flip flop is configured to set up the second logical output while the second flip flop is transparent and is configured to hold the second logical output while the second flip flop is opaque; and
the second flip flop is configured to receive the first logical output from the first flip flop as a second data input in the normal mode and is configured to receive a third logical output from a third flip flop in the scan mode.

\* \* \* \* \*